(12) United States Patent
Trowbridge

(10) Patent No.: US 9,717,179 B2
(45) Date of Patent: Aug. 1, 2017

(54) HYDRAULIC SYSTEM FOR A HEADER OF AN AGRICULTURAL HARVESTER

(71) Applicant: CNH America LLC, New Holland, PA (US)

(72) Inventor: Jeffrey C. Trowbridge, Stevens, PA (US)

(73) Assignee: CNH AMERICA LLC, New Holland, PA (US)

( * ) Notice: Subject to any disclaimer, the term of this patent is extended or adjusted under 35 U.S.C. 154(b) by 307 days.

(21) Appl. No.: 14/189,483

(22) Filed: Feb. 25, 2014

(65) Prior Publication Data
US 2015/0237799 A1    Aug. 27, 2015

(51) Int. Cl.
*F16H 61/4139* (2010.01)
*A01D 41/14* (2006.01)
*F16H 61/4061* (2010.01)

(52) U.S. Cl.
CPC ....... *A01D 41/142* (2013.01); *F16H 61/4061* (2013.01); *F16H 61/4139* (2013.01)

(58) Field of Classification Search
CPC .......................... F16H 61/4139; F16H 61/438
See application file for complete search history.

(56) References Cited

U.S. PATENT DOCUMENTS

| | | |
|---|---|---|
| 4,009,556 A | 3/1977 | Molzahn |
| 4,329,845 A * | 5/1982 | Parquet et al. ..... F16H 61/4139 60/422 |
| 5,791,128 A | 8/1998 | Rogalsky |
| 6,145,287 A * | 11/2000 | Rosskopf ................ F15B 11/17 56/10.9 |
| 6,494,025 B1 | 12/2002 | Killen et al. |
| 6,619,020 B1 | 9/2003 | Chaney et al. |
| 6,775,966 B2 | 8/2004 | Frego |
| 6,895,734 B2 | 5/2005 | Ameye |
| 7,467,505 B2 | 12/2008 | MacGregor |
| 7,497,069 B2 | 3/2009 | Enns et al. |
| 7,690,198 B2 * | 4/2010 | Rousseau et al. ... B60K 17/105 60/454 |
| 7,726,107 B2 | 6/2010 | Dueckinghaus et al. |
| 8,113,033 B2 | 2/2012 | Fackler et al. |
| 2013/0000293 A1* | 1/2013 | Dybing ............... F16H 61/4148 60/327 |
| 2014/0290200 A1 | 10/2014 | Trowbridge et al. |

* cited by examiner

*Primary Examiner* — F. Daniel Lopez
(74) *Attorney, Agent, or Firm* — Peter K. Zacharias; Patrick M. Sheldrake

(57) ABSTRACT

A hydraulic system for use with an agricultural harvester header is provided. The hydraulic system includes a reversible hydraulic pump that drives a reversible hydraulic motor in a forward or harvesting direction and a reverse or header cleaning direction. The system can further include a second reversible pump similarly driving a second reversible hydraulic motor in forward and reverse directions. The pumps and motors can be used to operate various header implements, e.g., the first pump and motor may be used to operate at least a crop cutting knife and the second pump and motor can be used to operate at least one conveyor. The pumps and motors operate within hydraulic circuits which share their hydraulic fluid with the harvester's hydraulic fluid reservoir, thereby reducing system weight, complexity and maintenance requirements.

19 Claims, 12 Drawing Sheets

HYDRAULIC SYSTEM FOR A HEADER OF AN AGRICULTURAL HARVESTER

BACKGROUND

The subject application relates generally to agricultural harvesters. In particular, the subject application relates to hydraulic systems for a header of an agricultural harvester in which the hydraulic systems of the header connected to the harvester share a hydraulic fluid reservoir.

Agricultural harvesters such as combine harvesters are well known apparatuses for harvesting grain crops. An agricultural harvester is typically a self-propelled vehicle which includes a feederhouse and mechanisms downstream of the feederhouse for separating grain from other crop material. A header is attached to the front of the harvester and includes mechanisms for cutting crop, gathering crop and delivering crop to the harvester's feederhouse.

As typically constructed, a combine harvester includes a hydraulic system which powers various subsystems of the harvester and the header. The hydraulic system includes a hydraulic fluid reservoir and one or more hydraulic pumps that can derive their motive force from power take offs (PTOs) directly or indirectly connected to the drive train of the harvester. The hydraulic pumps are in fluid communication with one or more hydraulic motors which drive equipment such as the harvester's steering and transmission subsystems as well as certain header subsystems such as harvesting reel rotation and position adjustment. However, in typical harvesters, header subsystems such as draper conveyor drives, auger drives and cutter drives are sustained by their own hydraulic systems, e.g., hydraulic systems that are independent of the combine's hydraulic system. These header subsystems include their own discrete reservoirs, filters, pumps, valve blocks and motors. As a consequence, there is added complexity, weight and cost associated with current header hydraulic systems, as well as the burdens of maintenance of the oil levels and filters of such systems.

BRIEF SUMMARY

The subject application provides a system for an agricultural combine comprising a harvester that includes a hydraulic fluid reservoir and a system pump that pumps hydraulic fluid from the reservoir to a hydraulic system of a header that is connectable to the harvester. Generally, the header hydraulic system includes at least one reversible hydraulic pump which derives its power from a PTO directly or is indirectly connected to the harvester's drive train. The hydraulic pump is operable to drive at least one reversible hydraulic motor in a forward direction so as to power a header in order to harvest crop and in a reverse direction in order to clear the header of clogged crop. The pump(s) and their associated motor(s) define at least one hydraulic circuit or loop which shares its hydraulic fluid with the combine's hydraulic fluid reservoir. In a forward or harvesting mode, the hydraulic circuit can receive pressurized hydraulic fluid from the output of a harvesting reel drive motor operatively connected to the hydraulic circuit. In a reverse or cleaning mode, the hydraulic circuit can receive pressurized hydraulic fluid from one or more hydraulic lines that are normally dedicated to reel positioning e.g., raising, lowering and/or tilting of the reel, when the harvester is in the harvesting mode. Since the hydraulic circuit shares hydraulic fluid with the combine's hydraulic fluid reservoir, fewer components are needed to operate the various header subsystems, while cost, weight, complexity and maintenance requirements are correspondingly reduced.

In accordance with a first aspect, the subject application provides a system comprising an agricultural combine that includes a harvester having a hydraulic fluid reservoir and a system pump for pumping hydraulic fluid from the reservoir to a hydraulic system of a header that is connectable to the harvester. The header hydraulic system includes a hydraulic circuit loop having a first reversible drive motor and a reversible pump for pumping hydraulic fluid to the first reversible drive motor. The hydraulic system further includes a first supply line in fluid communication with the system pump for supplying hydraulic fluid to the hydraulic circuit loop when the hydraulic system operates in a forward mode and a second supply line in fluid communication with the system pump for supplying hydraulic fluid to the hydraulic circuit loop when the hydraulic system operates in a reverse mode.

In accordance with a second aspect, the subject application provides a system comprising an agricultural combine that includes a harvester having a hydraulic fluid reservoir and a system pump for pumping hydraulic fluid from the reservoir to a hydraulic system of a header that is connectable to the harvester. The header hydraulic system includes a common hydraulic pressure line in fluid communication with the system pump and first and second hydraulic circuit loops in fluid communication with the common hydraulic pressure line. The first hydraulic circuit loop includes a first reversible drive motor downstream of the common hydraulic pressure line and a first reversible pump downstream of the common hydraulic pressure line for pumping hydraulic fluid to the first reversible drive motor. The second hydraulic circuit loop includes a second reversible drive motor downstream of the common hydraulic pressure line and a second reversible pump downstream of the common hydraulic pressure line for pumping hydraulic fluid to the second reversible drive motor.

In accordance with a third aspect, the subject application provides a system comprising an agricultural combine that includes a harvester having a hydraulic fluid reservoir and a system pump for pumping hydraulic fluid from the reservoir to a hydraulic system of a header that is connectable to the harvester. The header hydraulic system includes a hydraulic circuit loop that includes a first reversible drive motor and a reversible pump for pumping hydraulic fluid to the first reversible drive motor. The hydraulic system further includes a common return line in fluid communication with the first reversible drive motor, the reversible pump and the hydraulic fluid reservoir. In addition, the hydraulic system has first and second supply lines in fluid communication with the system pump. The first supply line supplies hydraulic fluid to the hydraulic circuit loop upstream of the reversible pump when the hydraulic system operates in a forward mode and the second supply line supplies hydraulic fluid to the hydraulic circuit loop upstream of the first reversible drive motor when the hydraulic system operates in a reverse mode.

In accordance with a fourth aspect, the subject application provides a system comprising an agricultural combine that includes a harvester having a hydraulic fluid reservoir and a system pump for pumping hydraulic fluid from the reservoir to a hydraulic system of a header that is connectable to the harvester. The header hydraulic system includes first and second hydraulic circuit loops in fluid communication with the system pump and a common return line in fluid communication with the first and second hydraulic circuit loops and the hydraulic fluid reservoir. The first hydraulic circuit loop includes a first reversible drive motor and a first reversible pump for pumping hydraulic fluid to the first reversible drive motor. The second hydraulic circuit loop includes a second reversible drive motor and a second reversible pump for pumping hydraulic fluid to the second reversible drive motor. A first supply line in fluid communication with the system pump supplies hydraulic fluid to the first and second hydraulic circuit loops when the hydraulic system operates in a forward mode, and a second supply line in fluid communication with the system pump supplies hydraulic fluid to the first and second hydraulic circuit loops when the hydraulic system operates in a reverse mode.

In accordance with a fifth aspect, the subject application provides a system comprising an agricultural combine that includes a harvester having a hydraulic fluid reservoir and a system pump for pumping hydraulic fluid from the reservoir to a hydraulic system of a header that is connectable to the harvester. The header hydraulic system includes first and second hydraulic circuit loops in fluid communication with the system pump and a common return line in fluid communication with the first and second hydraulic circuit loops and the hydraulic fluid reservoir. The first hydraulic circuit loop includes a first reversible drive motor and a first reversible pump for pumping hydraulic fluid to the first reversible drive motor. The second hydraulic circuit loop includes a second reversible drive motor and a second reversible pump for pumping hydraulic fluid to the second reversible drive motor. A first supply line in fluid communication with the system pump supplies hydraulic fluid to the first and second hydraulic circuit loops when the hydraulic system operates in a forward mode. A second supply line in fluid communication with the system pump supplies hydraulic fluid to the first hydraulic circuit loop when the hydraulic system operates in a reverse mode, and a third supply line in fluid communication with the system pump supplies hydraulic fluid to the second hydraulic circuit loop when the hydraulic system operates in a reverse mode.

The subject application also addresses the needs of conventional harvester hydraulic systems by engendering a new design that eliminates the hydraulic reservoirs, oil within the reservoirs, filter and related components by sharing oil with the combine via a reel circuit. A small amount of backpressure is applied to the exhaust oil from the reel circuit. This flow is directed to the low pressure side of the closed loop between the pumps and motors. The pumps (powered by the header PTO) use this oil to power the motors which drive the draper belts and knife drive. A portion of the exhaust oil from these motors is bled off and returned to the combine. In the event the header or feeder plug with crop, the header PTO is reversed at a much slower speed. This rotates the draper and knife drive pumps in reverse and the system develops pressure to shift various pilot operated valves. These valves direct oil flow from the combine to the feed draper motor and knife drive to operate them in reverse.

Accordingly, the system of the subject application can take advantage of the combine cooling system to maintain proper hydraulic fluid temperature and allow for improved performance of the header reversing function due to the flow from the combine adding with the flow from the knife and draper pumps. This is especially important since each combine platform uses a different mechanism (and inherent header PTO speed) to accomplish the feeder reversing function. A combine with slow header PTO speed can be supplemented with more flow from the combine to reverse the header motors. On the other hand, a combine with relatively high header PTO speed can add less added flow. This design essentially makes the header act the same regardless of the particular combine to which it is attached. Further, conventional combines can easily be made compatible with the new draper header of the subject application by adding a low pressure drain line to the tank and completing a software update (to allow reel flow during feeder reversing mode). The subject application further advantages the header by reducing the overall weight of the header, reducing cost of production, and providing increase torque capability to the various systems e.g., reel.

In brief, the subject application provides a system comprised of at least one PTO driven pump located on the header and corresponding motor(s) which drive functions such as a system of draper belts or a sickle knife. The generally circular oil flow path between the pump and motors is called a closed circuit which means the oil flow is not directly vented to a reservoir. When the pump is engaged, fluid on the high pressure side flows from the outlet of the pump to the inlet of the corresponding motor. The low pressure side is that portion of the circuit from the outlet of the (last) motor (in series) to the inlet of the pump.

As with any hydraulic system, heat is produced and must be removed from the circuit. Some heat is removed through the oil which leaks from the pump and motor shafts and is diverted to the case drain system. In addition, a portion of the low pressure side oil is bled from the low pressure side of the closed circuit. The case drain flow combines with the bleed flow and returns to the combine reservoir through a dedicated return line. Back pressure in this line needs to be low to help prevent shaft seal failures, particularly with startup in cold ambient conditions. The oil removed from the closed loops must continually to be replaced with additional flow into the closed circuit.

Although the entire system appears rather complex at first, it can be broken down into two basic modes; harvest and reverse. The harvest mode is when the combine is taking in crop and processing it as intended which involves normal flow of hydraulic oil to the motors. The reverse mode is used to clean out a slug of crop or other blockage and, as the name implies, causes the pumps and various motors to operate in the reverse direction.

Looking to the harvest mode, the draper and knife drive pumps produce fluid flow in the direction of the high pressure side of the close circuit. The combine operator can adjust the speed of the knife drive motor to accommodate different crop cutting conditions by diverting a portion of the oil flow through the flow control valve thus bypassing the motor. This adjustment can be accomplished remotely with an electrical devise or manually at the appropriate valve on the header. Similarly, the speed of the side draper motors and optional pea auger motor can be adjusted independently from the knife drive. Flow at the side draper motor is fixed since it does not require adjustability.

The low pressure side oil flow in both circuits makes its way back to the respective pump inlets but first some portion of the oil is bled out to the low side return through the orifice disk. The bleed oil flow rate is dictated by the size of the orifice and the pressure difference between the close circuit and the low side return line.

This low side return flow combines with the case drain flow and is allowed to return to the combine hydraulic reservoir through a dedicated return line. The case drain is normally much warmer than the oil in the closed circuit. The slow return flow rate and long physical distance to the reservoir allow the oil to cool sufficiently before reaching the reservoir.

At a point in each closed circuit downstream of the low side bleed, the charge oil flow is injected into both circuits to replenished fluid lost from the low side return flow and the case drains. Prior to entering the closed loops, the charge oil is conditioned with a filter and pressure reducer which maintains system cleanliness and limits the low side pressure respectively. The charge oil originates from a simple tee connection at the reel motor exhaust. Excess oil return flow not required to charge the draper header closed circuits is returned to the combine.

It is understood that the charge oil flow for this system is passive (having no dedicated charge pump) and relies on the back pressure of the excess reel return oil flow. This back pressure is a result of resistance of fluid flow through at least one manifold as well as a return filter. In order for the oil to be exchanged between the combine and the draper header, the pressure of the charge oil flow must be greater than that of the low side return flow. The necessary low back pressure is accomplished by properly sizing the inside diameter of the line, using a coupler with low pressure drop, and connecting the line directly to the reservoir without any other restrictions.

In certain crops and harvesting conditions where the reel speed needs to be very slow, the charge pressure flow is also greatly diminished. In extreme cases, oil flow through the orifice disk reverses direction (bypassing the orifice) and enters the low pressure side of the closed circuit. This added flow prevents cavitation of the low pressure side of the closed circuits under these extreme conditions.

In reverse cleaning mode schematic, the draper and knife drive pumps rotate in the reverse direction causing the oil in the circuits to flow opposite that of harvest mode. The corresponding motors also rotate in the reverse direction which allows crop slugs or other blockages to be removed. As before, the outlet of the pump to the inlet of the corresponding motor is the high pressure side while the outlet of the motor to the inlet of the pump being the low pressure side. However, since the pumps operating in reverse, the low and high pressure sides are opposite that of the forward harvest mode.

Reverse mode is normally accomplished at a much slower speed then forward direction. The slow speed is desirable since it allows for improved control and torque when cleaning out the slug of crop or blockage. However, corresponding slow PTO drive shaft speeds to the draper and knife drive pumps can result in very inefficient operation. At very low pump speeds, what little pump flow is produced will either leak internally (around the pump gears) or leak by the pump shafts to the case drain system. In this case, the motors may not rotate intermittently or not at all and the operator is left to clean the slug or blockage manually.

To allow for improved reverse motor operation, supplemental reversing flow from another circuit is injected into the closed circuits. This is similar to the charge oil flow except the flow is injected into the high pressure side of the closed circuit instead of the low pressure side as described earlier in the harvest mode. This "supercharging" of the high pressure side allows the motors to work properly in reverse mode since the draper and knife drive pumps are rotating too slow to produce sufficient flow.

For a draper header, one of the reel position circuits can be used for this function. The oil to the reel position circuit is temporarily diverted with a 3-way direction valve which can be controlled with automatic pilot pressure (as shown) or with a remote solenoid. The flow rate to both closed circuits is controlled with flow regulators at each inlet point. The reel position circuit is selected because it has higher circuit over the reel drive circuit which results in higher torque at to remove the crop slug or blockage.

The extra oil from the closed loop is removed from the low pressure side in the same way as harvest mode. Excess oil on the low pressure side of each loop is allowed to return unrestricted to the combine through the low pressure side return line. A pilot operated low side shuttle valve allows the low pressure side of the each closed circuit to connect to the low pressure return line.

While in reverse mode, it is advantageous to not engage the side draper motors since this will cause crop material to bunch up on the outermost ends of the draper belts. This bunched up material can cause further plugging issues once forward harvest mode resumes and the wad of material reaches the feed draper and combine feeder. To prevent reversing of the side draper motors, a pilot operated 2 way direction valve is used to automatically bypass these motors when the draper header is in reverse mode.

Finally, if while in reverse mode, either the knife drive or feed draper motor is not rotating for some reason, the respective check valve (located just downstream of the flow regulator) prevents high pressure oil from the stalled closed circuit from back feeding to the other closed circuit. The result of this feature is that full pressure is applied to the stalled motor to help remove the blockage without over speeding the other motor which was not plugged in the beginning.

Advantages of the subject application include multiple circuits connecting to a common reservoir, but with independent flow control in harvest mode for critical motors; capability of reversing the header PTO at a slow speed for improved torque and control without affecting on the draper and knife drive hydraulic circuits; unique reverse (cleaning) mode flow pattern of high pressure oil to the closed circuits to maintain acceptable motor speeds with very low pump speeds; and a dedicated drain line to the combine reservoir allows for the use of pumps and motors which require lower case drain pressures.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
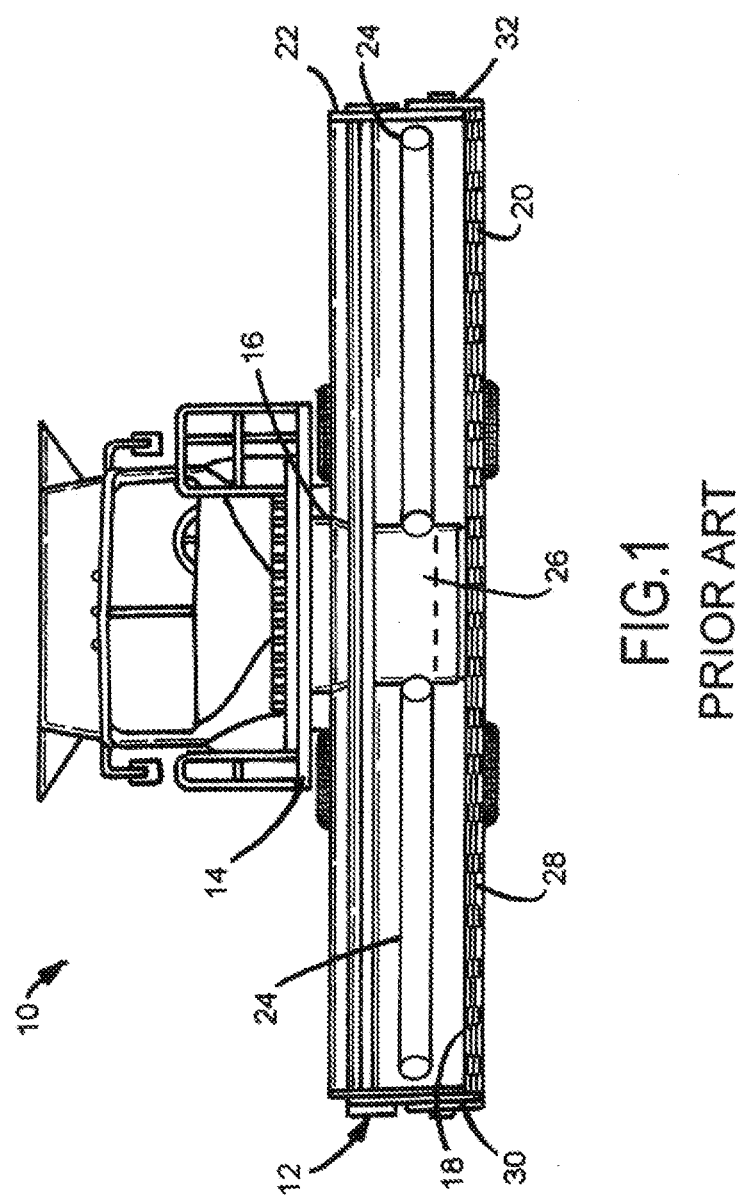
FIG. 1 is front elevation view of an agricultural harvester including a header.

Referring now to the drawings, wherein aspects of the subject application are shown, FIG. 1 illustrates an agricultural harvester 10 such as a combine. Harvester 10 includes a header 12 which is attached to a forward end 14 of the harvester and which is configured to cut crops and to induct the cut crops into a feederhouse 16 as harvester 10 moves forward over a crop field. Feederhouse 16 is configured to convey the cut crops into harvester 10 for threshing and cleaning.

In an exemplary header applicable to the subject application, the header 12 includes a floor 18 that is supported in desired proximity to the surface of a crop field and an elongate sickle or knife assembly 20 that extends transversely along a forward edge of the floor 18. Sickle assembly 20 is configured to cut crops in preparation for induction into the feederhouse 16. Additionally, header 12 includes an elongate, transversely extending harvesting reel 22 disposed above the sickle assembly 20. Harvesting reel 22 is rotatable in a direction suitable for facilitating the induction of cut crops into feederhouse 16. Header 12 further includes a pair of side draper conveyors 24 which receive crop from the harvesting reel and transfer the cut crop to a central feed draper conveyor 26. Upon receipt of the crop from the side draper conveyors, the feed draper conveyor delivers the crop to feederhouse 16. Header 12 may also include an optional auger positioned above the feed draper conveyor 26 to facilitate feeding of cut crop to the feederhouse. Alternatively, it will be understood that other conveyors such as an auger conveyor generally spanning the header and capable of delivering cut crop to the feederhouse 16 may be deployed in lieu of a feed draper conveyor and side draper conveyors as the characteristics of the crop being harvested may warrant.

Figure 2:
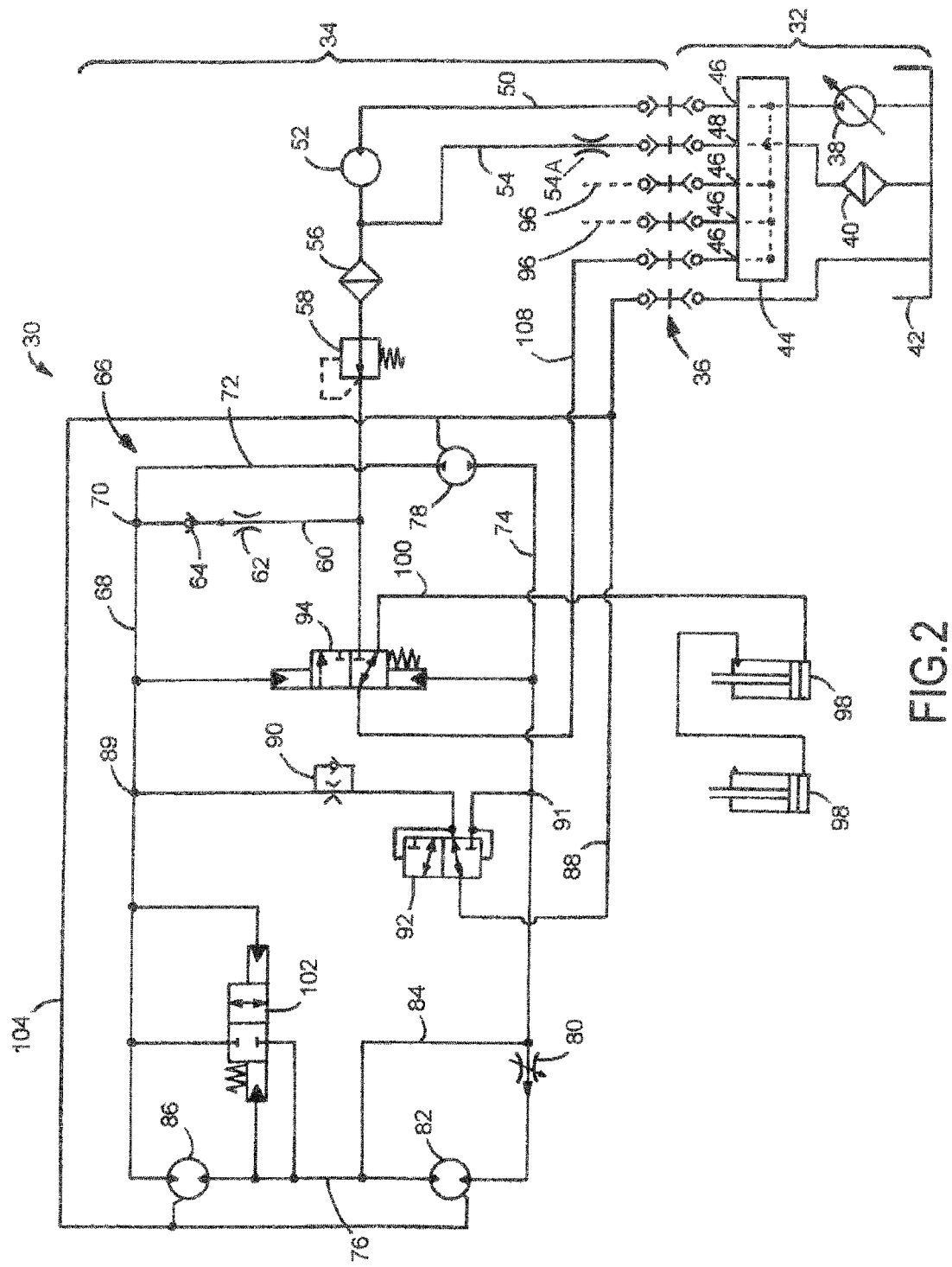
FIG. 2 is a schematic view of a hydraulic system according to an aspect of the subject application for use in connection with the agricultural harvester of FIG. 1.

Referring to FIG. 2, there is schematically depicted a combined hydraulic system 30 according to a first aspect of the subject application. Generally, the combined hydraulic system 30 includes a harvester hydraulic system 32 and a header hydraulic system 34 which are joined by a multi-coupler 36 to facilitate releasable hydraulic connection between the harvester hydraulic system 32 and the header hydraulic system 34.

The harvester hydraulic system 32 is situated on the harvester 10 and includes a system pump 38 and a return filter 40 both of which are in communication with a hydraulic fluid reservoir 42 and a hydraulic manifold 44. System pump 38 can be any pump capable of producing sufficient hydraulic fluid flow and pressure throughout the header hydraulic system 34. Although not limited thereto, an exemplary pump 38 can be a pressure-flow compensated ("PFC") pump such as a Series 45 axial piston open circuit pump manufactured by Danfoss of Ames, Iowa. It will be understood, however, that depending on the hydraulic demands of the header implements, different types of system pumps as well as those having greater or lesser flow and pressure characteristics can be deployed as necessary to achieve the objects of the subject application.

Hydraulic manifold 44 can be any suitable hydraulic manifold capable of effectively communicating hydraulic fluid to or from the combine hydraulic fluid reservoir 42 through hydraulic multi-coupler 36. As will be discussed in greater detail below, manifold 44 includes a plurality of fluid output ports 46 for delivering pressurized hydraulic fluid from the system pump 38 to the header hydraulic system 34 and at least one fluid input port 48 for receiving hydraulic fluid from the header hydraulic system.

In general, and as will be described in greater detail below, the header hydraulic system 34 comprises a hydraulic circuit loop 66 that includes a first reversible drive motor 82, and a reversible pump 78 for pumping hydraulic fluid to the first reversible drive motor. Also included are a first supply line 50 in fluid communication with the system pump 38 for supplying hydraulic fluid to the hydraulic circuit loop when the hydraulic system operates in a forward mode, and a second supply line 108 in fluid communication with the system pump for supplying hydraulic fluid to the hydraulic circuit loop when the hydraulic system operates in a reverse mode.

When the header hydraulic system 34 is operating in a forward or harvesting mode as discussed in greater detail in connection with FIG. 3, the first supply line 50 delivers hydraulic fluid to a reel drive motor 52. Downstream of the reel drive motor 52 is a reel drive motor return flow line 54 that drains excess reel drive hydraulic fluid through the fluid input port 48 of manifold 44 and return filter 40 into the hydraulic reservoir 42. In addition, when operating in a forward mode, fluid not diverted through the reel drive motor return oil flow line 54 is passed through a filter 56 and a pressure reducer 58. FIG. 2 illustrates an orifice 54A disposed in the reel drive motor return flow line 54 to represent the resistance to fluid flow through the reel drive motor return flow line 54 inherent in the manifold 44 and the return filter 40.

When operating in either a forward/harvesting mode or a reverse/cleaning mode (discussed below), hydraulic fluid or oil flowing into the header hydraulic system 34 enters a common hydraulic line 60 which is in communication with the first supply line 50 and a second supply line 108 discussed below in connection with FIG. 4. Common hydraulic line 60 includes, in series, a flow regulator 62 and a check valve 64. Flow regulator 62 may be any suitable manually or automatically operated flow regulator and check valve 64 regulates flow between the supply lines 50, 108 and the hydraulic circuit loop. Fluid from the common hydraulic line 60 exiting check valve 64 enters a first line 68 of the hydraulic circuit loop 66 at a T connection 70. Upon entering first line 68, hydraulic fluid flows in either of two directions (as discussed below) depending on whether the header hydraulic system 34 is operating in a forward or reverse mode.

Hydraulic circuit loop 66 further includes a second line 72, a third line 74 and a fourth line 76. A reversible pump 78 is operatively connected to the second line and can e.g., derive its power from an unillustrated PTO directly or indirectly connected to the harvester's drive train. Although not limited thereto, an exemplary pump 78 can be a reversible pump such as Polaris™ or Kappa® series pumps manufactured by Casappa® of Batavia, Ill. A manually or automatically operated flow control valve 80 can optionally be connected to the third line 74, and a first reversible drive motor 82 is connected to the fourth line 76. Although not limited thereto, an exemplary drive motor 82 can be a reversible motor such as a Kappa® series motor manufactured by Casappa® of Batavia, Ill. or an H-Series LSHT Gerotor motor manufactured by Eaton Hydraulics Group, Eden Prairie, Minn. Flow control valve 80 is used to control the speed of the first reversible drive motor 82 or completely bypass the first reversible drive motor via bypass line 84 when such may be desired or necessary. One or more optional reversible drive motor(s) 86 may also be provided in connection with fourth line 76. The reversible drive motor 82 is operable to drive e.g., a crop cutting knife assembly and optional drive motor(s) 86 can operate such equipment as augers, draper conveyors or other devices typical of agricultural header apparatus. As will be described in greater detail hereinafter, reversible pump 78 pumps hydraulic fluid to the first reversible drive motor 82 and the one or more optional reversible drive motor(s) 86.

It is significant that pump 78 and motor(s) 82 and 86 are reversible because it enables the combined hydraulic system of the subject application to operate in both forward/harvesting and reverse/cleaning modes. That is, pump 78 and motor(s) 82 and 86 are capable of operating in either direction whereby the harvester may effectively harvest crop and rid itself of clogged crop by reversing hydraulic fluid flow to the pump and motor(s) via hydraulic fluid supplied through separate first and second fluid supply lines. In contrast, unidirectional pumps and motors used in conventional harvesting apparatus are limited to driving header harvesting equipment in only the forward or harvesting direction via pressurized hydraulic fluid provided by a single fluid supply line. Consequently, in a conventional header clogged crop material must be cleared from the header by manually removing the clog from the header since the header pump and motor(s) do not operate in reverse. Such manual cleaning of the header can be time consuming as well as a laborious and messy job. The reversible pump and motor(s) of subject application essentially automates the cleaning process and liberates the operator from the task of manually cleaning the header.

Hydraulic circuit loop 66 further includes a return hydraulic line 88 in fluid communication with the hydraulic circuit loop and the hydraulic fluid reservoir 42. As will be discussed in greater detail below, fluid from return hydraulic line 88 flows from the low pressure side of the hydraulic circuit loop into the combine's hydraulic fluid reservoir. When the system according to the subject application is operating in a forward or harvesting mode, low pressure hydraulic fluid from first line 68 enters a T connection 89 and passes an orifice disk 90 and thereafter a low side shuttle valve 92 before draining into the combine's hydraulic fluid reservoir 42 through return hydraulic line 88. When the combined hydraulic system is operating in a reverse or cleaning mode, low pressure hydraulic fluid from third line 74 enters a T connection 91 and passes through the low side shuttle valve 92 and return hydraulic line 88.

A three-way directional valve or other suitable valve 94 is piloted into various flow dispositions depending on relative hydraulic pressures within the first line 68 and third line 74 of the hydraulic circuit loop 66. Valve 94 is in fluid communication with at least one fluid output port 46 of hydraulic manifold 44 via the line 108. Additionally, valve 94 is in fluid communication with reel position cylinders 98 via line 100. In a forward or harvesting operating mode, discussed below, valve 94 functions to provide fluid to the reel position cylinders 98 to effectuate raising, lowering and/or tilting of the header's harvesting reel 22 (FIG. 1). Still further, a two-way directional valve or other suitable valve 102 can be provided to connect the first line 68 and the fourth line 76 of the hydraulic circuit loop 66 to control the speed of or completely bypass optional reversible drive motor(s) 86 in the event such motor(s) are provided in the header hydraulic system.

Header hydraulic system 34 further includes a common return hydraulic line or case drain line 104 into which hydraulic fluid is drained into directly from the reversible pump 78, the first reversible drive motor 82 and optional drive motor(s) 86 via respective connecting lines. The common return hydraulic line 104 is connected to and in fluid communication with the return hydraulic line 88. An advantage of the common return hydraulic line 104 is that it permits hot oil at the reversible pump 78 and reversible motor(s) 82, 86 to be drained and cooled with minimal resistance as it passes from the pump and motor(s) to the combine's hydraulic fluid reservoir 42.

Figure 3:
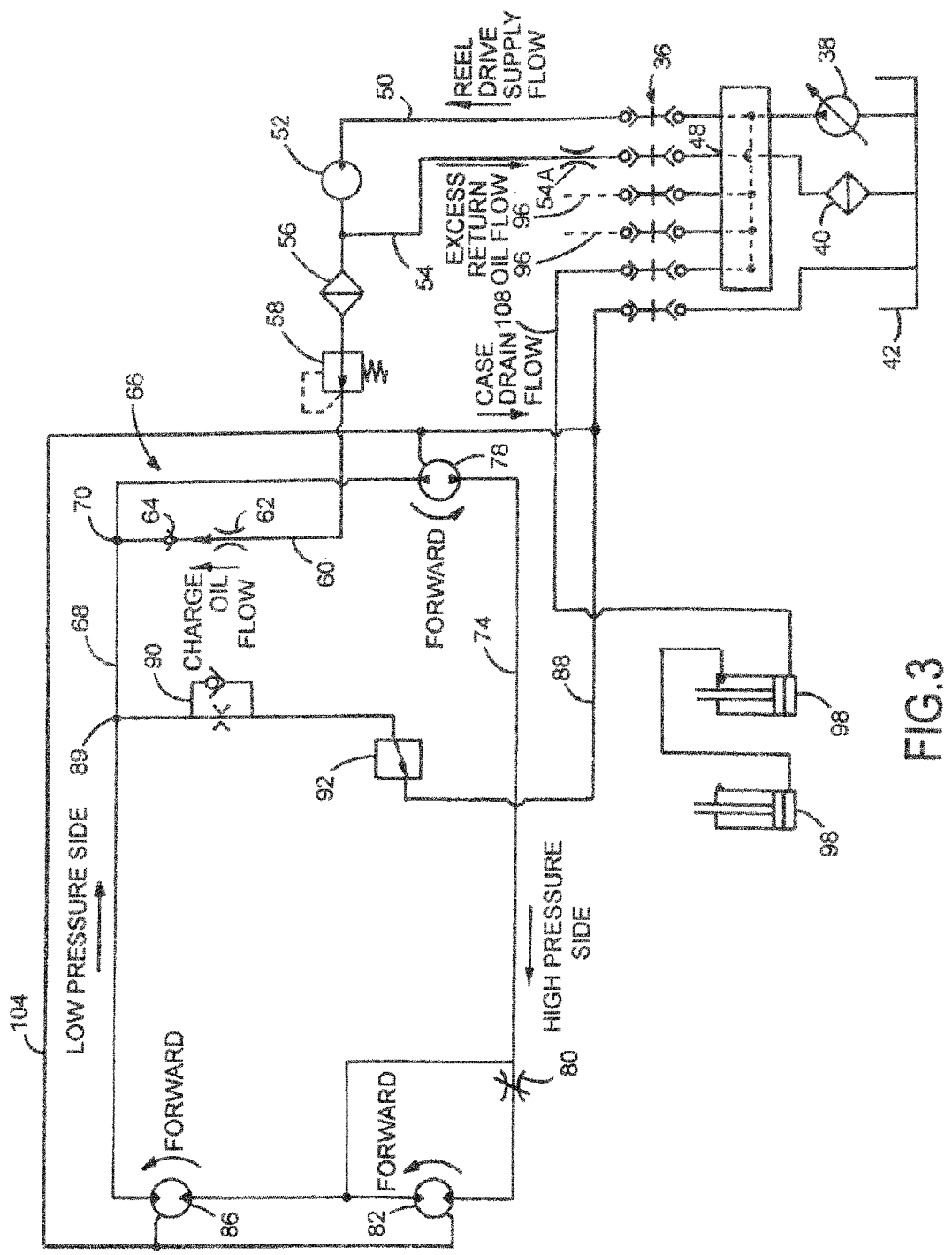
FIG. 3 is a partial schematic view of the hydraulic system of FIG. 2 illustrating operation in a forward or harvesting mode.

Referring to FIG. 3, there is shown a simplified representation of the header hydraulic system 34 (from FIG. 2) illustrating the functioning of the header hydraulic system in a forward or harvesting mode. As seen in FIG. 3, pressurized hydraulic fluid is pumped by the system pump 38 through first supply line 50 which delivers hydraulic fluid to the reel drive motor 52. As mentioned above, excess return oil from the reel drive motor passes via reel drive motor return flow line 54, through multi-coupler 36 and manifold fluid input port 48, through filter 40 and into the hydraulic fluid reservoir 42. The quantity of excess reel drive motor return oil passing through the reel drive motor return oil flow line 54 is determined by the fluid demands of the hydraulic circuit loop 60, in particular the requirements of the reversible hydraulic pump 78. That is, if the reversible hydraulic pump 78 requires a certain flow in order to drive the reversible motor 82 and optional reversible motor(s) 86 during operation of the header hydraulic system in a forward mode, and the flow of hydraulic fluid pumped by the system pump 38 exceeds the demands of the reversible hydraulic pump 78, then excess flow is diverted into reel drive motor return flow line 54 for return to the hydraulic reservoir 42.

Flow not diverted to the reel drive motor return flow line 54 passes filter 56 and pressure reducer 58 before entering the hydraulic circuit loop 66 via the common hydraulic line 60. Upon passing flow regulator 62 and check valve 64, hydraulic fluid enters the first line 68 of the hydraulic circuit loop at T connection 70. In the forward or harvesting mode of operation, first line 68 lies on the low pressure side of the hydraulic circuit loop and fluid flows from the T connection 70 to the reversible pump 78 which is driven by the harvester PTO in a forward direction. Hydraulic fluid exiting the reversible pump passes along the third line 74 or the high pressure side of the hydraulic circuit loop toward the first reversible drive motor 82. After passing the flow control valve 80, hydraulic fluid enters the first reversible drive motor 82 thereby driving the motor in a forward direction in order to power associated equipment to achieve crop cutting, conveying or whatever other function may be effectuated by forward operation of the first reversible drive motor. Fluid discharged from the first reversible drive motor 82 then passes to optional reversible drive motor(s) 86, if any, and drives it or them in a forward direction in order to drive header equipment such as one or more conveyors. Regardless of the presence or absence of drive motor(s) 86, fluid passes from the first reversible pump 82 to the first line 68 of the hydraulic circuit loop 66 whereupon it combines with new fluid introduced via the common hydraulic line 60.

However, in order to compensate for the mass of hydraulic fluid introduced into the hydraulic circuit loop 66 via the common hydraulic line 60, a portion of the fluid must be drained from the loop into the hydraulic reservoir 42. Accordingly, a certain quantity of low pressure side hydraulic fluid is diverted at T connection 89 whereupon it passes the orifice disk 90 before entering the return hydraulic line 88. The flow drawn off at T connection 89 is determined by the flow passage characteristics of orifice disk 90 coupled with the available pressure in the first line or low pressure side 68 of the hydraulic circuit loop as determined by the setting of the pressure reducer valve 58. Fluid exiting the orifice disk 90 passes the low side shuttle valve 92 (FIG. 2) and enters the return hydraulic line 88 whereupon it combines with case drain fluid from the common return hydraulic line 104 and drains into the hydraulic reservoir 42. Fluid not diverted at T connection 89 combines with incoming fluid at T connection 70 and is recycled through the hydraulic circuit loop 66. In addition, pressurized hydraulic fluid can optionally be passed through lines 96 and valve 94 (FIG. 2) in order to operate one or more reel position cylinders 98 to manipulate the header reel.

Figure 4:
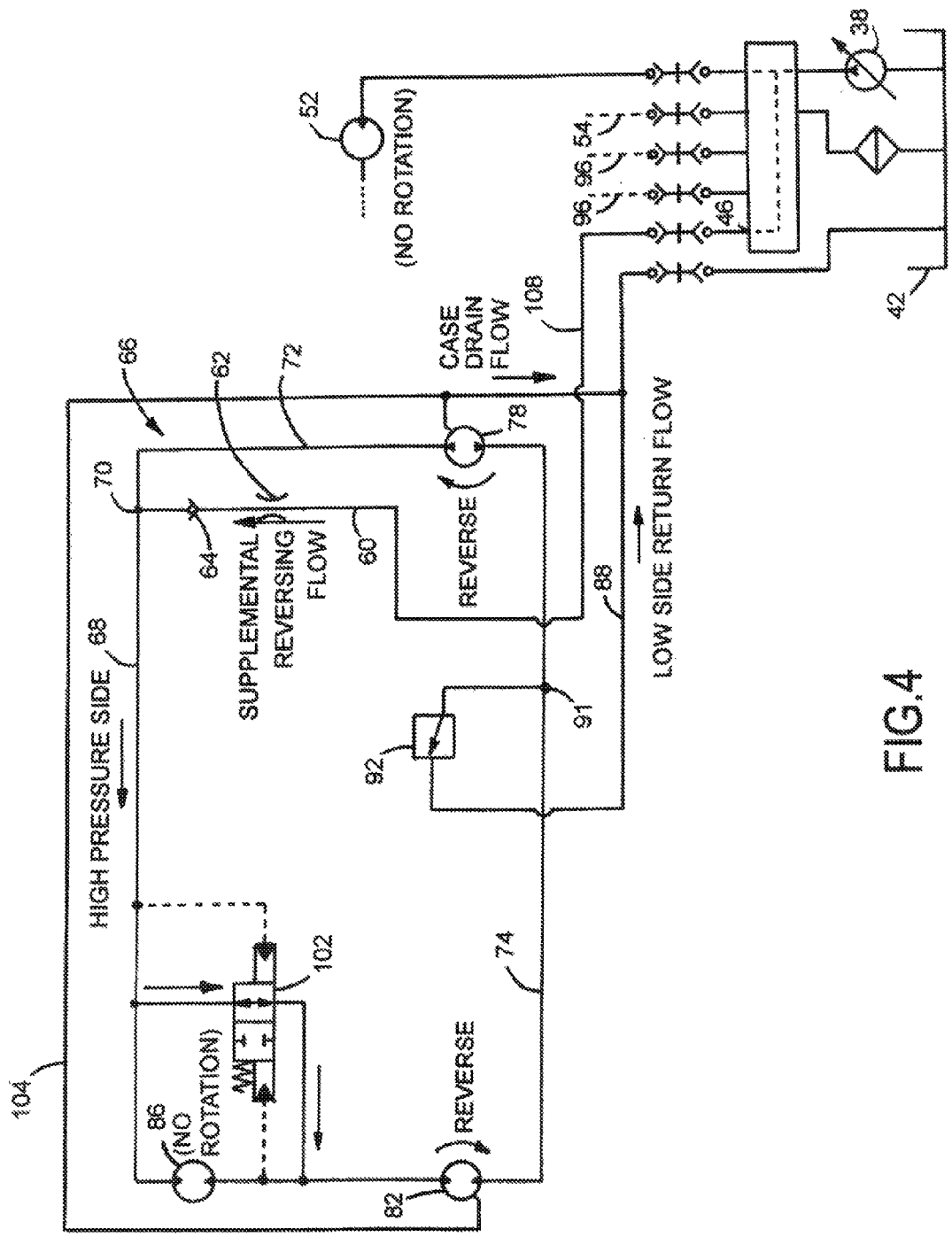
FIG. 4 is a partial schematic view of the hydraulic system of FIG. 2 illustrating operation in a reverse or cleaning mode.

Referring to FIG. 4 there is shown a simplified representation of the header hydraulic system 34 (from FIG. 2) illustrating the functioning of the header hydraulic system in a reverse or cleaning mode. In the reverse mode, the header hydraulic system is operated to remove cut crop that might be clogged at the mouth of the feederhouse 16, the sickle assembly 20 or the central feed draper conveyor 26 (FIG. 1). As seen in FIG. 4, reel drive motor 52 is prevented from rotating since there is no need for rotation of the harvesting reel during removal of a clog.

During operation of the header hydraulic system in reverse mode, pressurized hydraulic fluid is pumped by the system pump 38 through a fluid output port 46 of hydraulic manifold 44 and into a second supply line 108 which communicates with the common hydraulic line 60. Since reel operation and manipulation is not necessary during the reverse or cleaning mode, second supply line 108 can be a diverted line of the lines 96 which are normally used to supply pressurized hydraulic fluid to the reel position cylinders (FIGS. 2 and 3) in the forward or harvesting mode. It will be understood that the others of lines 96 will be shut off by unillustrated valves during the reverse mode of operation in order to prevent unintended operation of the reel position cylinders.

Upon passing the flow regulator 62 and check valve 64, hydraulic fluid enters the first line 68 of the hydraulic circuit loop 66 at T connection 70. In the reverse or cleaning mode of operation, first line 68 lies on the high pressure side of the hydraulic circuit loop and fluid flows from the T connection 70 to the first reversible drive motor 82. Since no rotation is required of the optional reversible drive motor(s) 86 in reverse mode, valve 102 can be piloted under the pressure in first line 68 to cause fluid in the first line to bypass the reversible drive motor(s) 86 in the event such motor(s) are provided in the header hydraulic system. Under a reverse or cleaning mode, the flow of hydraulic fluid entering the hydraulic circuit loop 66 is considered a supplemental high pressure reversing flow since it enters on the high pressure rather than the low pressure side of the loop. This arrangement is advantageous in that high pressure fluid is used to drive first reversible drive motor 82 in reverse in order to push the clogged crop from its lodged condition at the feederhouse 16, sickle assembly 20 or central feed draper conveyor 26 (FIG. 1). That is, according to the subject application, pressurized hydraulic fluid supplied by the first supply line 50 is required for the header to harvest crop and pressurized hydraulic fluid supplied by the second supply line 108 is required to enable the header to free itself of clogged crop material.

Fluid discharged from the first reversible drive motor 82 passes through the third line 74 of the hydraulic circuit loop 66, which is the low pressure side of the loop, to the reversible pump 78. During a reverse or cleaning mode, reversible pump 78 is driven by the harvester PTO in a reverse direction, i.e., opposite the direction the pump is driven when the combine is in a harvesting mode, at relatively low speed to produce high torque for dislodging clogged crop from the header.

In order to compensate for the mass of hydraulic fluid introduced into the hydraulic circuit loop 66 via the common hydraulic line 60, a portion of the hydraulic fluid is diverted from line 74 before entering pump 78. Such fluid enters a T connection 91 and passes through the low side shuttle valve 92 before entering return hydraulic line 88 which drains into the hydraulic fluid reservoir 42. Simultaneously, case drain fluid is drained directly from the first reversible drive motor 82 and the reversible pump 78 into the common return hydraulic line 104 via respective connecting lines, which fluid combines with the fluid from the return hydraulic line 88 before draining into the hydraulic reservoir 42.

Figure 5:
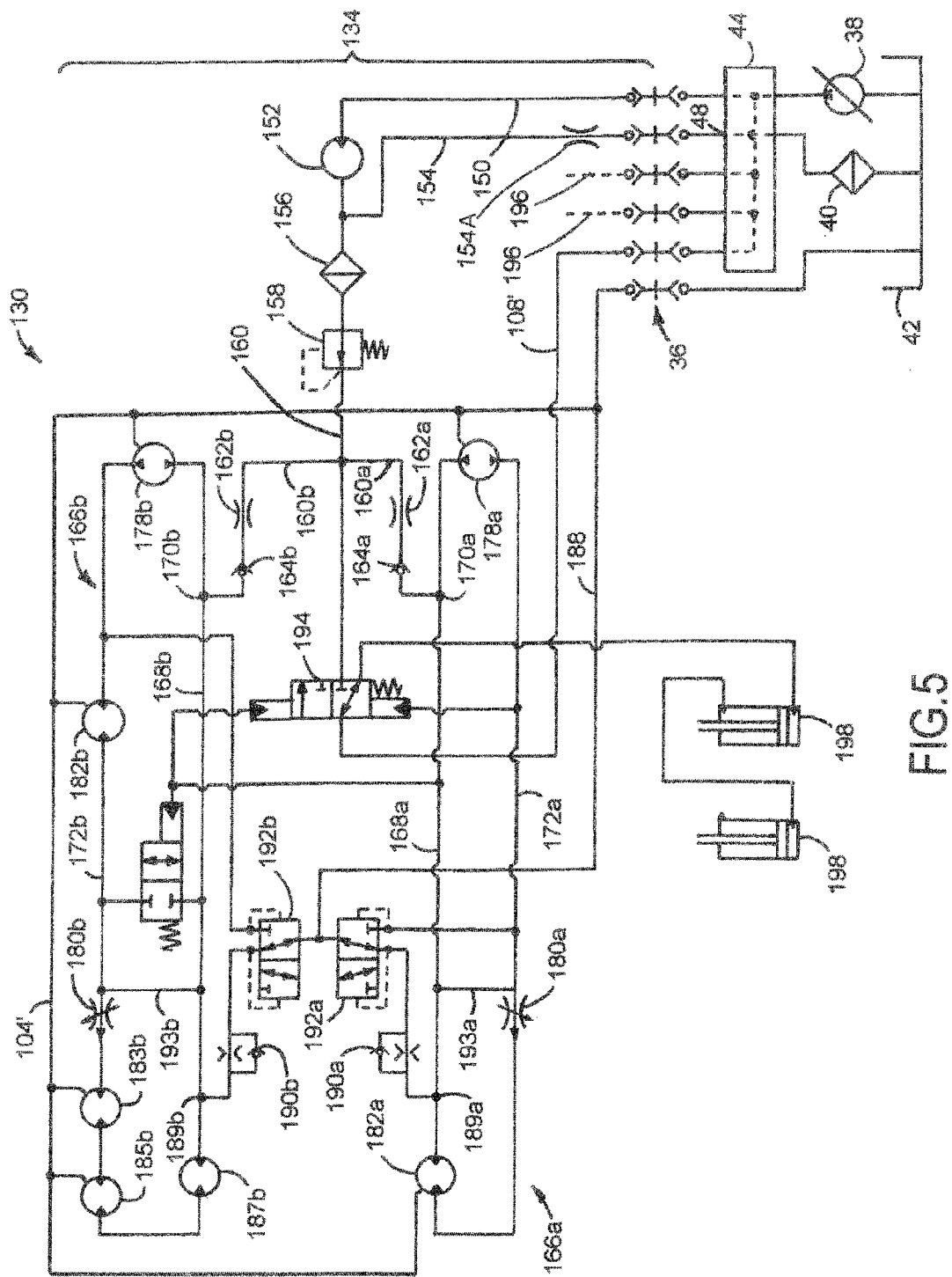
FIG. 5 is a schematic view of a hydraulic system according to another aspect of the subject application for use in connection with the agricultural harvester of FIG. 1.

Referring to FIG. 5, there is shown a combined hydraulic system 130 according to a further aspect of the subject application. Combined hydraulic system 130 includes the aforementioned multi-coupler 36 as well as the above-described harvester hydraulic system components, namely, the system pump 38, filter 40, hydraulic fluid reservoir 42 and manifold 44. As will be disclosed in further detail below, the combined hydraulic system 130 includes a header hydraulic system 134 comprising a common hydraulic pressure line comprising branches 160*a* and 160*b* in fluid communication with the system pump 38 and first and second hydraulic circuit loops 166*a* and 166*b*. The first hydraulic circuit loop 166*a* includes a first reversible drive motor 182*a* downstream of the common hydraulic pressure line branch 160*a* and a first reversible pump 178*a* downstream of the common hydraulic pressure line for pumping hydraulic fluid to the first reversible drive motor. The second hydraulic circuit loop 166*b* includes a second reversible drive motor 182*b* downstream of the common hydraulic pressure line branch 160*b* and a second reversible pump 178*b* downstream of the common hydraulic pressure line for pumping hydraulic fluid to the second reversible drive motor. The first and second reversible pumps 178*a*, 178*b* can e.g., derive their power from one or more PTOs directly or indirectly connected to the drive train of the harvester. The first and second reversible motors 182*a*, 182*b* are reversible motors capable of operation in a forward and reverse mode, such as e.g., Kappa® series motors manufactured by Casappa® of Batavia, Ill. or H-series LSHT Gerotor motors manufactured by Eaton Hydraulics Group of Eden Prairie, Minn. For example, the first reversible motor 182*a* can be a reversible knife drive motor for driving a sickle or cutter bar assembly and the second reversible motor 182*b* can be a reversible feed draper motor. The second hydraulic circuit loop 166*b* can also include additional motors 183*b*, 185*b* such as side draper motors, as well as an optional pea auger motor 187*b* should harvesting circumstances warrant the inclusion of such equipment on the header.

At minimum, it is contemplated that the subject header hydraulic system 134 can consist essentially of a common hydraulic pressure line e.g., line 160, in communication with the system pump 38 as well as with the first and second hydraulic circuit loops 166*a*, 166*b*. More particularly, the first hydraulic circuit loop 166*a* can include the first reversible drive motor 182*a* situated downstream of the common hydraulic pressure line 160. In addition, the first reversible pump 178*a* is situated downstream of the common hydraulic pressure line for pumping hydraulic fluid to the first reversible drive motor 182*a*. Similarly, the second hydraulic circuit loop 166*b* can include the second reversible drive motor 182*b* situated downstream of the common hydraulic pressure line 160. Additionally, the second reversible pump 178*b* is situated downstream of the common hydraulic pressure line for pumping hydraulic fluid to the second reversible drive motor 182*b*.

When the header hydraulic system 134 is operating in a forward or harvesting mode as discussed in greater detail in connection with FIG. 6, header hydraulic system 134 includes a first supply line 150 which delivers hydraulic fluid to a reel drive motor 152. A reel drive motor return flow line 154 drains excess reel drive oil through a fluid input port 48 of manifold 44 and return filter 40 into the hydraulic fluid reservoir 42. In addition, when operating in a forward mode, fluid not diverted through the reel drive motor return flow line 154 is passed through a filter 156 and a pressure reducer 158 corresponding in structure and function to filter 56 and pressure reducer 58 discussed above in connection with FIG. 2. FIG. 5 illustrates an orifice 154A disposed in the reel drive motor return flow line 154 to represent the resistance to fluid flow through the reel drive motor return flow line 154 inherent in the manifold 44 and the return filter 40.

The first supply line 150 is in fluid communication with the common hydraulic pressure line 160 and the hydraulic fluid reservoir 42 for supplying hydraulic fluid to the common hydraulic pressure line when the combined hydraulic system 130 operates in a forward or harvesting mode. Likewise, a second supply line 108' (FIG. 7) is in fluid communication with the common hydraulic pressure line 160 and the hydraulic fluid reservoir 42 for supplying hydraulic fluid to the common hydraulic pressure line when the combined hydraulic system 130 operates in a reverse or cleaning mode.

FIG. 5 reveals that the common hydraulic pressure line 160 delivers pressurized hydraulic fluid to a first flow regulator 162*a* and a first check valve 164*a* in communication with the first hydraulic circuit loop 166*a*. Similarly, the common hydraulic pressure line 160 delivers pressurized hydraulic fluid to a second flow regulator 162*b* and a second check valve 164*b* in communication with the second hydraulic circuit loop 166*b*.

The first hydraulic circuit loop 166*a* includes a first line 168*a* and a second line 172*a* each connected to the first reversible pump 178*a* and the first reversible drive motor 182*a*. The second hydraulic circuit loop 166*b* includes a first line 168*b* and a second line 172*b* each connected to the second reversible pump 178*b* and the second reversible drive motor 182*b*.

A first T connection 170*a* connects the common hydraulic pressure line branch 160*a* with the first hydraulic circuit loop 166*a* and a second T connection 170*b* connects the common hydraulic pressure line branch 160*b* with the second hydraulic circuit loop 166*b*. The second line 172*a* of the first hydraulic circuit loop 166*a* is operatively connected to a first manually or automatically operated flow control valve 180*a* and the second line 172*b* of the second hydraulic circuit loop 166*b* is operatively connected to a second manually or automatically operated flow control valve 180*b*. Each of the first and second hydraulic circuit loops 166*a*, 166*b* can also include first and second bypass lines located adjacent the flow control valves 180*a*, 180*b* and connecting the respective first and second lines 193*a*, 193*b* of such loops.

As will be discussed in greater detail in connection with FIGS. 6 and 7, in order to compensate for the mass of hydraulic fluid introduced into the hydraulic circuit loops 166*a*, 166*b* via the common hydraulic line 160, a portion of the fluid must be drained from the loops into the hydraulic fluid reservoir 42. Accordingly, regardless of whether the system is operating in a forward or reverse mode, a certain quantity of low pressure side hydraulic fluid must be diverted to the return hydraulic line 188.

Figure 6:
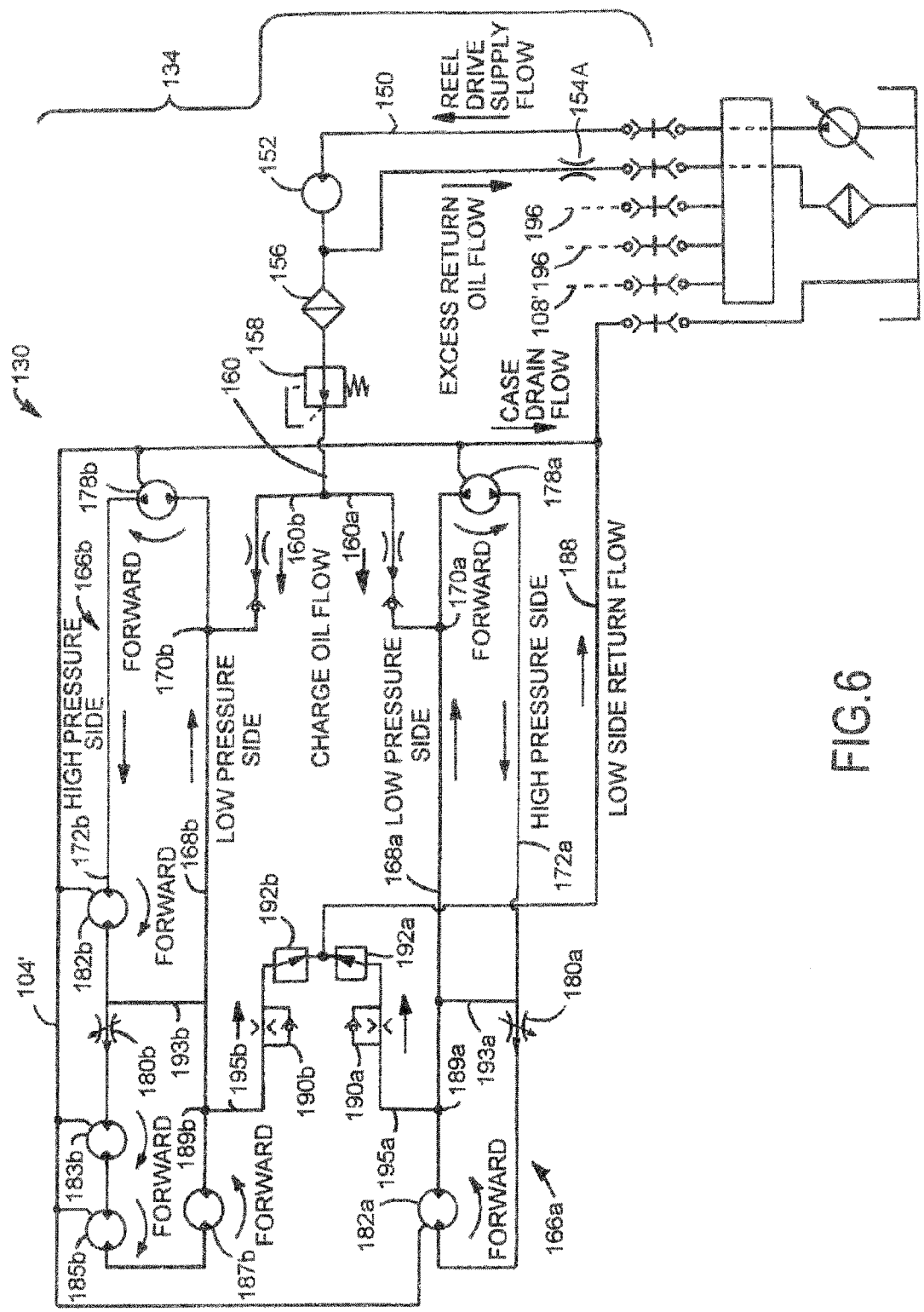
FIG. 6 is a partial schematic view of the hydraulic system of FIG. 5 illustrating operation in a forward or harvesting mode.

As shown in FIG. 6, in the forward mode, hydraulic fluid is drawn off of low pressure line 168*a* at T connection 189*a* through a first return hydraulic line 195*a* which is in communication with the first loop 166*a*. Similarly, flow is drawn off of low pressure line 168*b* at T connection 189*b* through a second return hydraulic line 195*b* which is in communication with the second loop 166*b*. The quantity of flow drawn off at T connections 189*a*, 189*b* is determined by the flow passage characteristics of orifice disks 190*a*, 190*b* coupled with the available pressure in the first lines or low pressure sides 168*a*, 168*b* of the hydraulic circuit loops 166*a*, 166*b* as determined by the setting of the pressure reducer valve 158. In forward mode, fluid exits the orifice disks 190*a*, 190*b* and passes the low side shuttle valves 192*a*, 192*b* and enters the return hydraulic line 188 whereupon it combines with case drain fluid from a common return hydraulic line 104' and drains into the hydraulic fluid reservoir 42. That is, the first and second return hydraulic lines 195*a*, 195*b* are in fluid communication with the common return hydraulic line 104' which is in fluid communication with the hydraulic fluid reservoir 42. As with the system described above in connection with FIGS. 2-4, hydraulic fluid is also drained directly from the first and second reversible pumps 178*a*, 178*b* and first and second reversible motors 182*a*, 182*b* into the common return hydraulic line 104' via respective connecting lines. Fluid not diverted at T connections 189a, 189b combines with incoming fluid at T connections 170a, 170b and is recycled through the hydraulic circuit loops 166a, 166b.

In forward mode, first flow control valve 180a is opened a sufficient amount to permit hydraulic fluid to flow to the first reversible drive motor 182a and drive the motor to operate at a desired speed. Depending on the desired speed of the motor 182a, a certain quantity of fluid may be diverted by bypass line 193a from line 172a (the high pressure line) to line 168a (the low pressure line). In the event that motor 182a is to be operated at full speed, the flow control valve may be fully opened whereby little or no hydraulic fluid passes from line 172a to line 168a via bypass line 193a.

Similarly, in forward mode hydraulic fluid flow from the second reversible drive motor 182b may be throttled by selective control of the second flow control valve 180b whereby a desired quantity of flow from the second reversible drive motor 182b is diverted through second bypass line 193b from line 172b (the high pressure line) to line 168b (the low pressure line). It is contemplated that if the header is a draper header and the second reversible drive motor 182b is a feed draper motor, then a portion of the hydraulic fluid output from such a motor will be passed to the side draper motors 183b, 185b (and optional pea auger motor 187b, if present) in order to operate those motors. That is, in forward mode at least some fluid will normally pass through the second flow control valve 180b in order to operate the motors that are downstream of the second reversible motor 182b.

In addition, in forward mode pressurized hydraulic fluid may be passed through the line 108' and three-way directional valve or other suitable valve 194 (FIG. 5) in order to operate one or more reel position cylinders 198 (FIG. 5) to manipulate the header reel in the manner described above in connection with FIG. 3.

Figure 7:
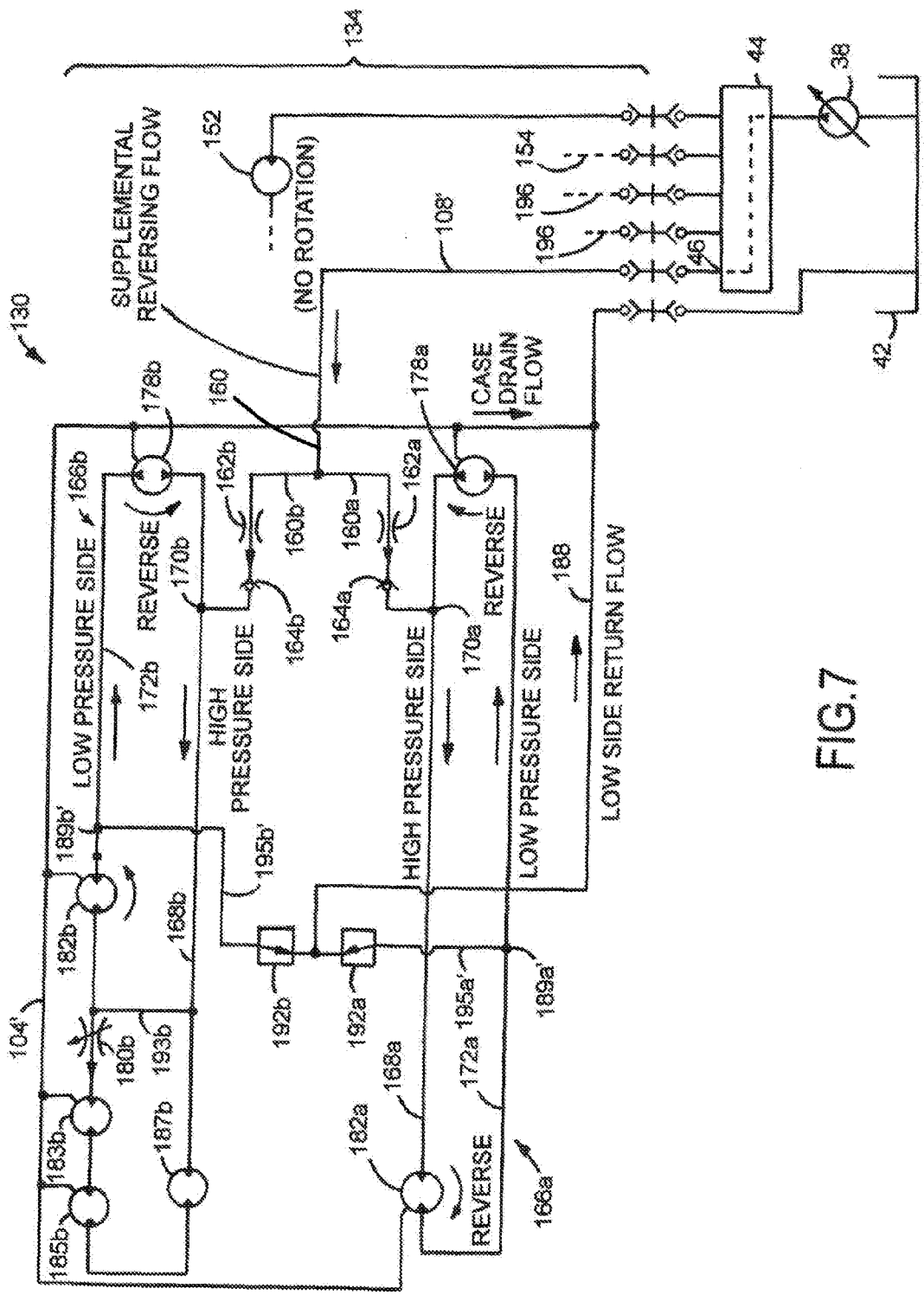
FIG. 7 is a partial schematic view of the hydraulic system of FIG. 5 illustrating operation in a reverse or cleaning mode.

Referring to FIG. 7 there is shown a simplified representation of the header hydraulic system 134 illustrating the functioning of the header hydraulic system in a reverse or cleaning mode. As noted above in connection with FIGS. 2-4, in the reverse mode, the header hydraulic system is operated to remove cut crop that might be clogged at the mouth of the feederhouse 16, the sickle assembly 20 or the central feed draper conveyor 26 (FIG. 1). As seen in FIG. 7, reel drive motor 152 is prevented from rotating since there is no need for rotation of the harvesting reel during removal of a clog.

During operation of the header hydraulic system 134 in reverse mode, pressurized hydraulic fluid is pumped by combine system pump 38 through a fluid output port 46 of hydraulic manifold 44 and into the second supply line 108' which communicates with the common hydraulic line 160. Since reel operation and manipulation is not necessary during the reverse or cleaning mode, second supply line 108' can consist of a diverted line of one of the lines 196 which are normally used to supply pressurized hydraulic fluid to the reel position cylinders (FIG. 5) in the forward or harvesting mode. It will be understood that the others of lines 196 will be shut off by unillustrated valves during the reverse mode of operation in order to prevent unintended operation of the reel position cylinders.

Upon passing the flow regulators 162a, 162b and check valves 164a, 164b, hydraulic fluid enters the first lines 168a, 168b of the hydraulic circuit loops 166a, 166b at T connections 170a, 170b, respectively. In the reverse or cleaning mode of operation, the first lines 168a, 168b lie on the high pressure side of the hydraulic circuit loops and fluid flows from the T connections 170a, 170b to the first and second reversible drive motors 182a, 182b. Since no rotation is required of the reversible drive motor(s) 183b, 185b and 187b in reverse mode, the second flow control valve 180b can be operated to cause fluid in the first line 168b to bypass the reversible drive motor(s) 183b, 185b and 187b via bypass line 193b in the event such motor(s) are provided in the header hydraulic system. Under a reverse or cleaning mode, the flow of hydraulic fluid entering the hydraulic circuit loops 166a, 166b can be considered a supplemental high pressure reversing flow since it enters on the high pressure rather than the low pressure side of the loops. This arrangement is advantageous in that high pressure fluid is used to drive the first and second reversible drive motors 182a, 182b in reverse in order to reverse operation of the header implement and push the clogged crop from its lodged condition at the feederhouse 16, the sickle assembly 20 or the central feed draper conveyor 26 (FIG. 1).

Fluid discharged from the first and second reversible drive motors 182a, 182b passes through the lines 172a, 172b of the hydraulic circuit loops 166a, 166b, which lines constitute the low pressure sides of the loops, to the reversible pumps 178a, 178b. During a reverse or cleaning mode, reversible pumps 178a, 178b are driven by the harvester PTO in a reverse direction, i.e., opposite the direction the pumps are driven when the combine is in a harvesting mode, at relatively low speed to produce high torque for dislodging clogged crop.

In order to compensate for the mass of hydraulic fluid introduced into the hydraulic circuit loops 166a, 166b via the common hydraulic line 160, a portion of the hydraulic fluid is diverted from low pressure lines 172a, 172b before entering pumps 178a, 178b. Such fluid enters T connections 189a', 189b' and passes through first and second return hydraulic lines 195a', 195b' before entering return hydraulic line 188 which drains into the hydraulic reservoir 42. Simultaneously, case drain fluid is drained directly from the first and second reversible drive motor 182a, 182b and the first and second reversible pump 178a, 178b into the common return hydraulic line 104' via respective connecting lines, which fluid combines with the fluid from return hydraulic line 188 before draining into the hydraulic reservoir 42.

Figure 8:
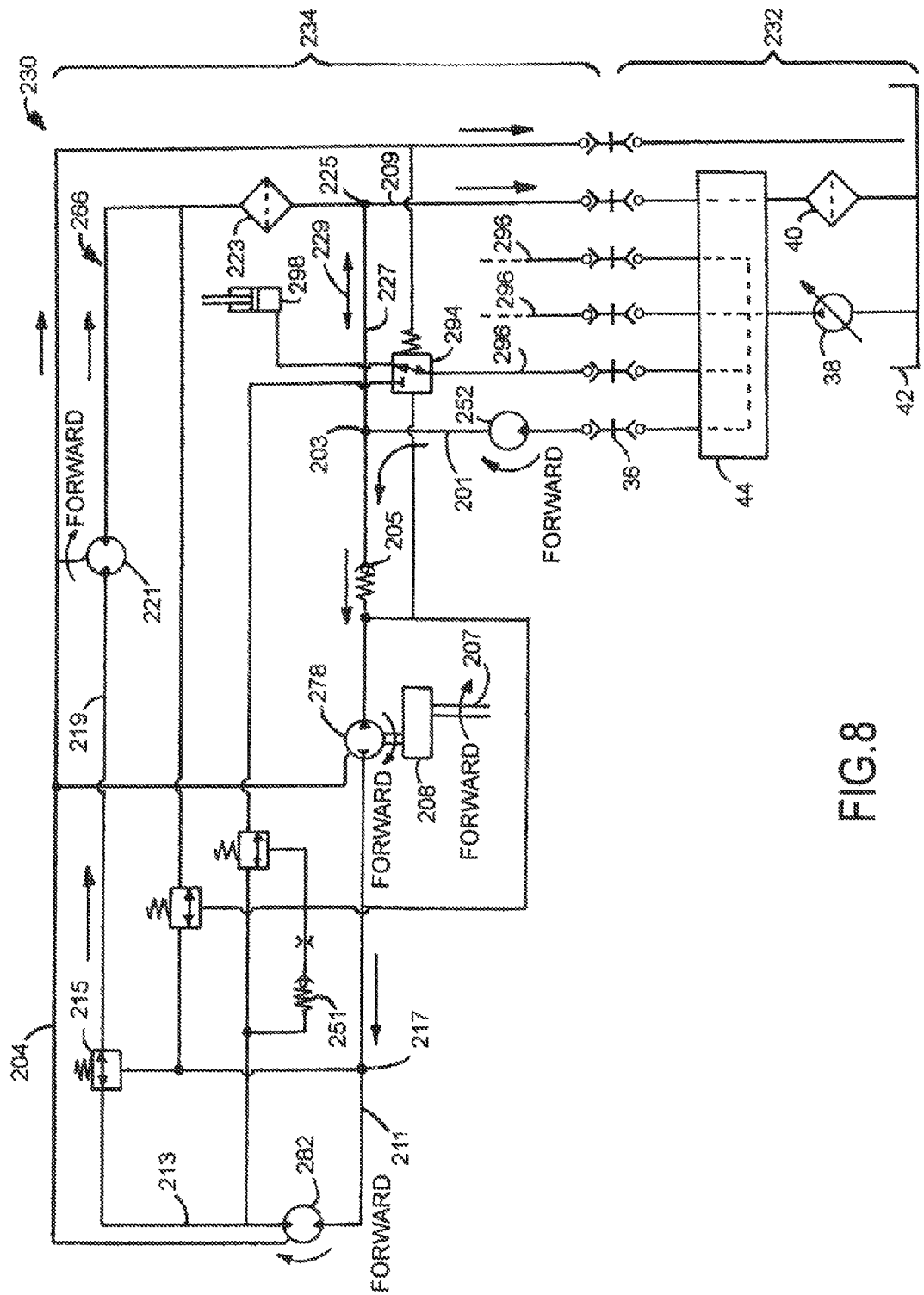
FIG. 8 is a schematic view of a hydraulic system according to yet another aspect of the subject application for use in the agricultural harvester of FIG. 1 illustrating operation in a forward or harvesting mode.
Figure 9:
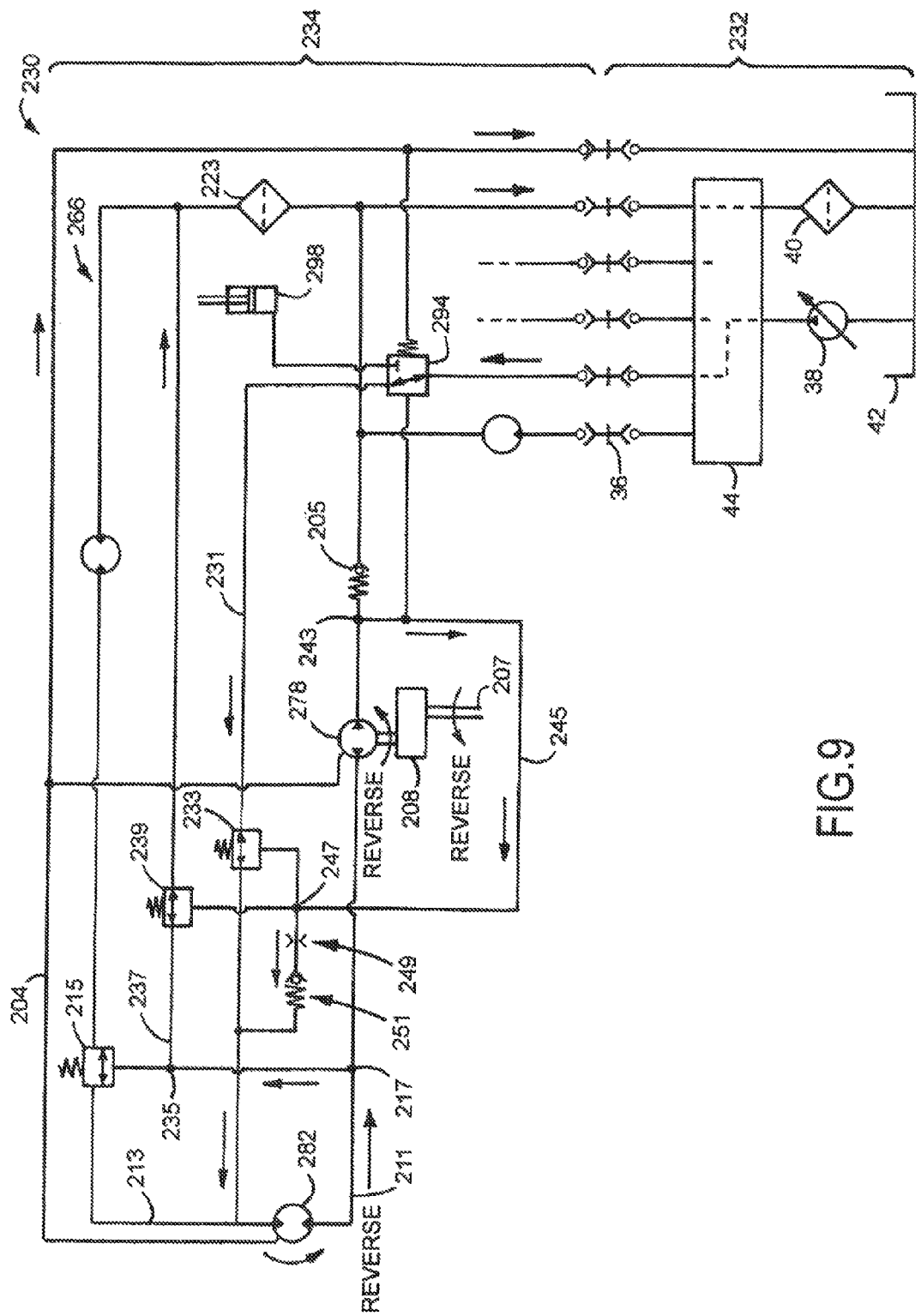
FIG. 9 is a schematic view of the hydraulic system of FIG. 8 illustrating operation in a reverse or cleaning mode.

Referring to FIGS. 8 and 9, there is shown a combined hydraulic system 230 according to a further aspect of the subject application. Combined hydraulic system 230 includes a harvester hydraulic system 232 having the aforementioned multi-coupler 36 as well as the above-described harvester hydraulic system components, namely, the system pump 38, filter 40, hydraulic fluid reservoir 42 and manifold 44. The combined hydraulic system 230 further includes a header hydraulic system 234 including a hydraulic circuit loop 266 having a first reversible drive motor 282 and a reversible pump 278 for pumping hydraulic fluid to the first reversible drive motor. The header hydraulic system also includes a common return line 204 in fluid communication with, inter alia, the first reversible drive motor, the reversible pump and the hydraulic fluid reservoir 42. In addition, the header hydraulic system has first and second supply lines in fluid communication with the system pump 38 and which are each independently in communication with the manifold 44. The first supply line 201 (discussed in connection with FIG. 8) supplies hydraulic fluid to the hydraulic circuit loop 266 upstream of the reversible pump 278 when the hydraulic system operates in a forward mode and the second supply line 231 (discussed in connection with FIG. 9) supplies hydraulic fluid to the hydraulic circuit loop upstream of the first reversible drive motor 282 when the hydraulic system operates in a reverse mode.

FIG. 8 shows the schematic layout of the header hydraulic system 234 as it would appear when operating in a forward or harvesting mode. In this mode, pressurized hydraulic fluid is pumped from system pump 38 through manifold 44 and multi-coupler 36 to reel drive motor 252 in order to drive such motor in a forward or harvesting direction. Simultaneously, fluid is pumped by the system pump 38 through one or more lines 296 to at least one three-way valve 294 in order to drive one or more reel position cylinders 298 for raising, lowering and/or tilting of the harvesting reel 22 (FIG. 1).

Pressurized hydraulic fluid exiting the reel drive motor 252 then enters the first supply line 201 upstream of reversible pump 278 for supplying hydraulic fluid to the hydraulic circuit loop 266. Before reaching pump 278, however, pressurized fluid from the first supply line encounters a T connection 203 and a check valve 205. Upon passing the check valve 205, the pressurized hydraulic fluid enters the pump 278. Pump 278 can be reversibly driven by a PTO 207 directly or indirectly connected to the drive train of the harvester. The PTO 207 in turn operates a gearbox 208 for controlling the speed of the pump 278 in the forward and reverse directions.

The amount of fluid that reaches pump 278 from the first supply line 201 is dependent on the demands of the pump under forward or harvesting conditions. For example, when the pump 278 is operating at full speed forward conditions, the pump will draw essentially all of the fluid passing through first supply line 201. If, however, the pump 278 demands less than the full flow from the first supply line 201, a quantity of flow is diverted at T connection 203 toward a return hydraulic line 209, discussed below.

Fluid exiting pump 278 is delivered along a line 211 to the first reversible drive motor 282 thereby driving motor 282 in a forward direction. Motor 282 can be e.g., a reversible knife or sickle drive motor or any other reversible motor capable of operating equipment normally associated with an agricultural harvester header. Fluid exiting motor 282 is then delivered along a line 213 to a two-way valve 215 which is connected to line 211 via a T connection 217 and is piloted into an open position based on the pressure in line 211. Fluid exiting two-way valve 215 is then delivered along a line 219 which can be connected to one or more optional reversible drive motors 221 of the type used to drive conveyors or other equipment normally associated with an agricultural harvester header in order to drive such motor(s) in a forward direction. Fluid passing though line 219, notwithstanding the presence or absence drive motor(s) 221, then passes a filter 223 which leads to a T connection 225. Depending on the demands of the reversible pump 278, fluid reaching the T connection 225 can take either of two courses each of which may represent the path of least resistance.

For example, if the demand of the pump 278 is low (i.e., the pump is operating at a relatively low forward speed), then a comparatively lesser quantity of hydraulic fluid is needed to satisfy pump demand. Under these circumstances, fluid reaching T connection 225 may pass through the return hydraulic line 209, through manifold 44 and filter 40 before returning to the hydraulic fluid reservoir 42. Conversely, if the demand of the pump 278 is high (i.e., the pump is operating at a relatively high forward speed) fluid will be diverted to the pump from the T connection 225 through a first recycle hydraulic line 227 in fluid communication with the first reversible drive motor and the reversible pump when the header hydraulic system operates in a forward mode. Still further, again depending on the demands of pump 278 and as indicated by double-headed arrow 229, some fluid from the first supply line 201 may backflow through the first recycle line 227 and be diverted at T connection 225 into return hydraulic line 209.

Similar to earlier described aspects of the invention, case drain fluid is drained directly from the first reversible drive motor 282 and reversible pump 278 into a common return line 204 via respective connecting lines. In addition, valve 294 also preferably drains directly into the common return line 204 via a connecting line. Unlike prior aspects, however, line 204 leads directly to the hydraulic fluid reservoir 42. That is, the common return line 204 is separate from return hydraulic line 209. Therefore, case drain oil flowing from the pump 278, motor 282 and valve 294, which is among the hottest oil in the header hydraulic system, experiences minimal resistance and optimum cooling during its return to the hydraulic fluid reservoir 42.

FIG. 9 shows the schematic layout of the header hydraulic system 234 as it would appear when operating in a reverse or cleaning mode. In this mode, pressurized hydraulic fluid is pumped from system pump 38 through manifold 44, multi-coupler 36 and valve 294. In the reverse operating mode, valve 294 is piloted to a position whereby fluid flows not to the reel position cylinder(s) 298 but to the second supply line 231 in fluid communication with the system pump 38 for supplying hydraulic fluid to the hydraulic circuit loop 266 upstream of the first reversible drive motor 282. More specifically, fluid from valve 294 is delivered along second supply line 231 where it passes through a two-way valve 233 which is piloted into an open position, as described below, after which it enters the first reversible drive motor 282 in order to drive such motor in a reverse or cleaning direction.

Fluid exiting the first reversible drive motor 282 then enters line 211 which leads back to the reversible pump 278. Prior to reaching pump 278, however, and depending on the demands of pump 278, some of the fluid from the first reversible drive motor 282 may be diverted at T connection 217 toward a T connection 235 at which it is diverted to a line 237. While flowing through line 237 the hydraulic fluid passes through a two-way valve 239 which is piloted into an open position, as described below. From there the fluid flows through filter 223 before passing through multi-coupler 36, manifold 44 and filter 40 before returning to the hydraulic fluid reservoir 42.

Fluid not diverted at T connection 217 passes to the reversible pump 278 which is driven by PTO 207 and gearbox 208 in a reverse direction at a speed generally slower than the forward direction in order to produce the torque necessary to free clogged crop from the feederhouse opening. Fluid exiting the reversible pump 278 is stopped from flowing back to the combine through lines 227 and 209 (FIG. 8) by check valve 205. Accordingly, such fluid is diverted at a T connection 243 to flow through a second recycle line 245 (the pressure from which is used to pilot valve 294 to deliver fluid from the system pump 38 to the second supply line 231). The second recycle line 245 is in fluid communication with the first reversible drive motor 282 and the reversible pump 278 when the hydraulic system operates in a reverse mode. Fluid passing through line 245 flows to a cross connection 247 from which fluid passes an orifice 249 and a check valve 251 before merging with fluid from the second supply line 231 and entering the first reversible drive motor 282. The purpose of orifice 249 is to create sufficient back pressure at cross connection 247 to pilot two-way valves 233 and 239 into their open positions.

In reverse mode, the function of check valve 251 is to prevent fluid from the second supply line 231 from flowing into the second recycle line 245. In forward mode (FIG. 8), flow from motor 282 through line 213 is prevented from recirculating to the inlet of pump 278 because of check valve 251

Figure 10:
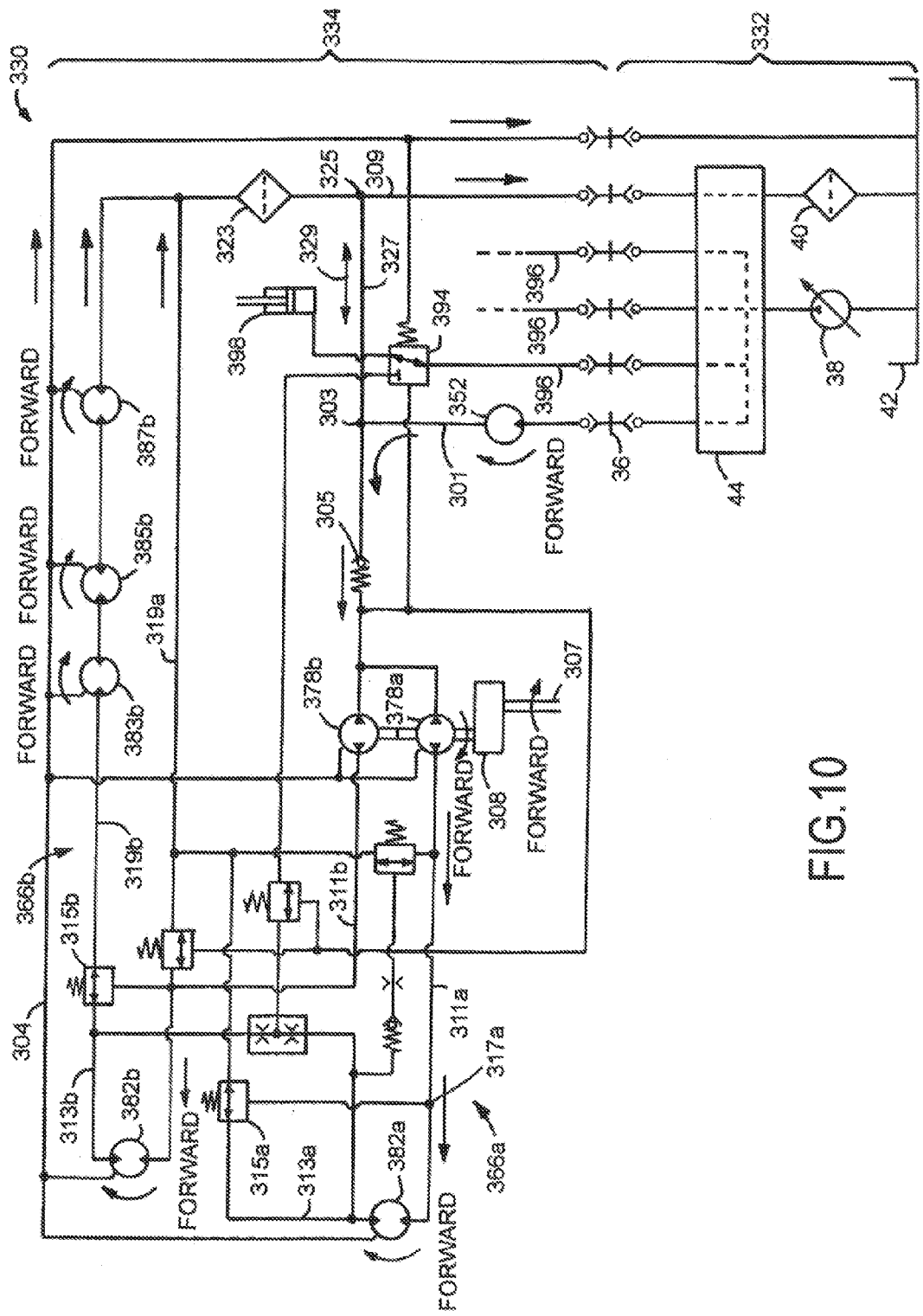
FIG. 10 is a schematic view of a hydraulic system according to another aspect of the subject application for use in connection with the agricultural harvester of FIG. 1 illustrating operation in a forward or harvesting mode.
Figure 11:
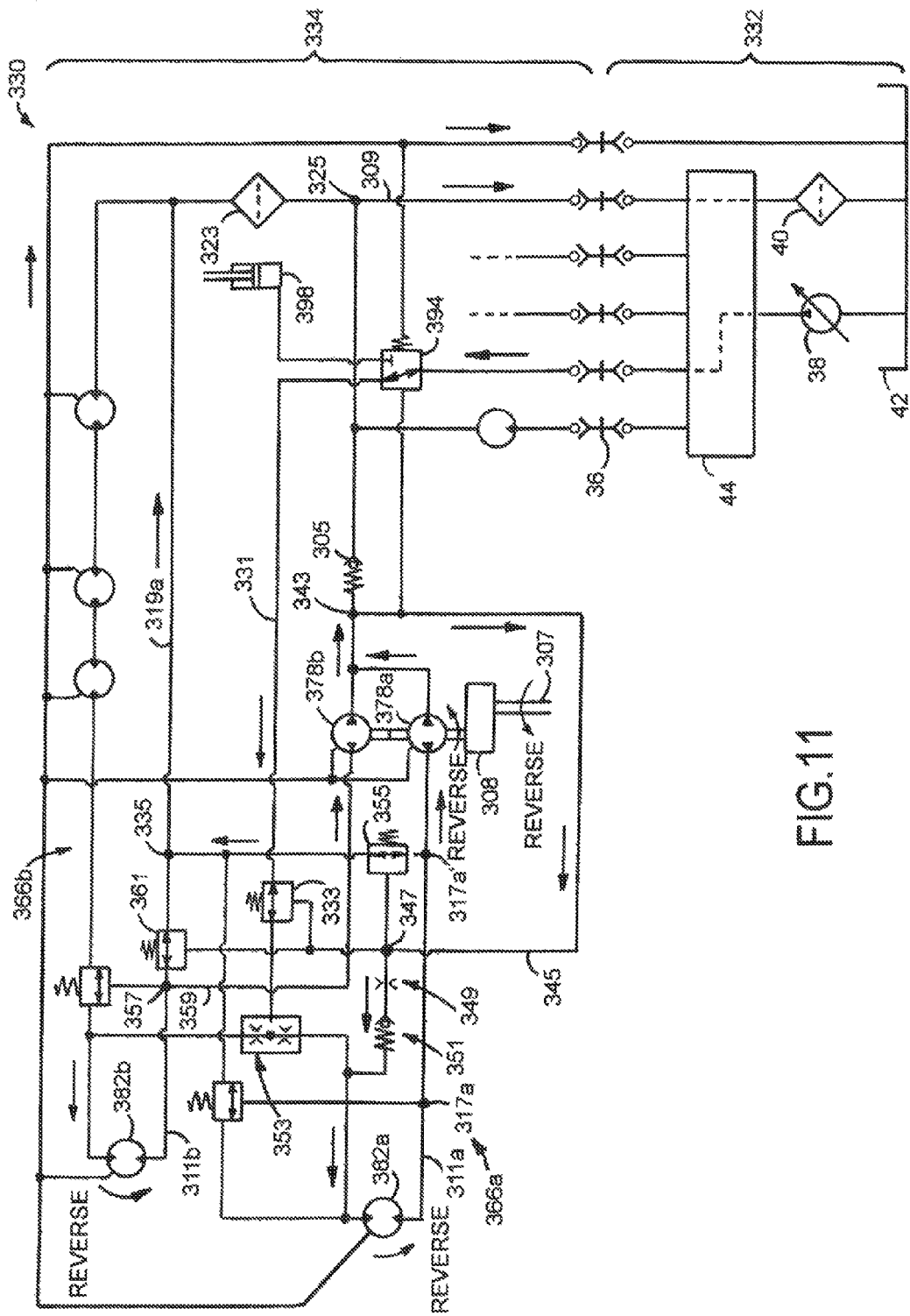
FIG. 11 is a schematic view of the hydraulic system of FIG. 10 illustrating operation in a reverse or cleaning mode.

Referring to FIGS. 10 and 11, there is shown a combined hydraulic system 330 according to yet a further aspect of the subject application. Combined hydraulic system 330 includes a harvester hydraulic system 332 having the aforementioned multi-coupler 36 as well as the above-described harvester hydraulic system components, namely, the system pump 38, filter 40, hydraulic fluid reservoir 42 and manifold 44. The combined hydraulic system 330 further includes a header hydraulic system 334 comprising first and second hydraulic circuit loops 366a, 366b in fluid communication with the system pump 38 and a common return line 304 in fluid communication with the first and second hydraulic circuit loops and the hydraulic fluid reservoir. The first hydraulic circuit loop 366a includes a first reversible drive motor 382a and a first reversible pump 378a for pumping hydraulic fluid to the first reversible drive motor. The second hydraulic circuit loop 366b includes a second reversible drive motor 382b and a second reversible pump 378b for pumping hydraulic fluid to the second reversible drive motor.

A first supply line 301 (FIG. 10) in fluid communication with the system pump 38 supplies hydraulic fluid to the first and second hydraulic circuit loops when the hydraulic system 334 operates in a forward mode, and a second supply line 331 (FIG. 11) in fluid communication with the system pump supplies hydraulic fluid to the first and second hydraulic circuit loops when the hydraulic system 334 operates in a reverse mode. The first and second reversible pumps 378a, 378b are arranged in parallel and driven by one or more PTOs directly or indirectly connected to the harvester's drive train.

At minimum, it is contemplated that the subject header hydraulic system 334 can consist essentially of the first and second hydraulic circuit loops 366a, 366b, the first supply line 301, the second supply line 331 and the common return line 304. The first and second hydraulic circuit loops 366a, 366b are in fluid communication with the system pump 38. The first hydraulic circuit loop 366a includes the first reversible drive motor 382a and the first reversible pump 378a for pumping hydraulic fluid to the first reversible drive motor. The second hydraulic circuit loop 366b includes the second reversible drive motor 382b and the second reversible pump 378b for pumping hydraulic fluid to the second reversible drive motor. The first supply line 301 is in communication with the system pump and supplies hydraulic fluid to the first and second hydraulic circuit loops 366a, 366b when the header hydraulic system operates in a forward mode and the second supply line 331 is in communication with the system pump and supplies hydraulic fluid to the first and second hydraulic circuit loops 366a, 366b when the header hydraulic system operates in a reverse mode. The common return line 304 is in fluid communication with the first and second hydraulic circuit loops 366a, 366b and the hydraulic fluid reservoir 42.

FIG. 10 shows the schematic layout of the header hydraulic system 334 as it would appear when operating in a forward or harvesting mode. In this mode, pressurized hydraulic fluid is pumped from system pump 38 through manifold 44 and multi-coupler 36 to a motor e.g., a reel drive motor 352 in order to drive such motor in a forward or harvesting direction. Simultaneously, fluid is pumped by the system pump 38 through one or more lines 396 to at least one three-way valve 394 in order to drive one or more mechanisms e.g., reel position cylinders 398 for raising, lowering and/or tilting of the harvesting reel 22 (FIG. 1).

Pressurized hydraulic fluid exiting the reel drive motor 352 enters the first supply line 301 upstream of reversible pumps 378a, 378b for supplying hydraulic fluid to the hydraulic circuit loops 366a, 366b. Before reaching pumps 378a, 378b, which pumps are arranged in parallel, pressurized fluid from the first supply line 301 encounters a T connection 303 and a check valve 305. Upon passing the check valve 305, the pressurized hydraulic fluid enters the pumps 378a, 378b. Pumps 378a, 378b can be driven and reversibly driven by a PTO 307 directly or indirectly connected to the drive train of the harvester. The PTO 307 in turn operates a gearbox 308 for controlling the speed of the pumps 378a, 378b in the forward and reverse directions.

The amount of fluid that reaches pump 378a, 378b from the first supply line 301 is dependent on the demands of the pumps under forward or harvesting conditions. For example, when the pumps 378a, 378b are operating at full speed forward conditions, the pumps will draw essentially all of the fluid passing through first supply line 301. If, however, the pumps 378a, 378b demand less than the full flow from the first supply line 301, a quantity of flow is diverted at T connection 303 toward a return hydraulic line 309, further discussed below.

Fluid exiting pump 378a is delivered along a line 311a to the first reversible drive motor 382a thereby driving motor 382a in a forward direction. The motor 382a can be e.g., a reversible knife or sickle drive motor or any other reversible motor capable of operating equipment normally associated with an agricultural harvester header. Fluid exiting motor 382a is then delivered along a line 313a to a two-way valve 315a which is connected to line 311a via a T connection 317a and is piloted into an open position based on the pressure in line 311a. Fluid exiting two-way valve 315a is then delivered along a line 319a and then passes a filter 323 which leads to a T connection 325.

Fluid exiting pump 378b is delivered along a line 311b to the second reversible drive motor 382b thereby driving motor 382b in a forward direction. The motor 382b can be e.g., a reversible feed draper drive motor or any other reversible motor capable of operating equipment normally associated with an agricultural harvester header. Fluid exiting motor 382b is then delivered along a line 313b to a two-way valve 315b which is connected to line 311b and is piloted into an open position based on the pressure in line 311b. Fluid exiting two-way valve 315b is then delivered along a line 319b. Along the way, fluid flowing through line 319b may encounter and forwardly drive additional motors 383b, 385b such as e.g., side draper motors, as well as an optional pea auger motor 387b should harvesting circumstances warrant the inclusion of such equipment on the header. Notwithstanding the presence or absence of motors 383b, 385b and/or 387b, fluid in line 319b then passes through filter 323 before reaching T connection 325.

Depending on the demands of the reversible pumps 378a, 378b, fluid reaching the T connection 325 can take either of two courses each of which may represent the path of least resistance. For example, if the demand of the pumps 378a, 378b is low (i.e., the pumps are operating at a relatively low forward speed), then a comparatively lesser quantity of hydraulic fluid is needed to satisfy pump demand. Under these circumstances, fluid reaching T connection 325 can pass through the return hydraulic line 309, through manifold 44 and filter 40 before returning to the hydraulic fluid reservoir 42. Conversely, if the demand of the pumps 378a, 378b is high (i.e., the pumps are operating at a relatively high forward speed) fluid will be diverted to the pumps from the T connection 325 through a common recycle hydraulic line 327 in fluid communication with the first and second hydraulic circuit loops 366a, 336b and the hydraulic fluid reservoir 42. The common recycle line 327 recycles fluid upstream of the first and second reversible pumps 378a, 378b when the header hydraulic system operates in a forward mode. However, depending on the demands of pumps 378a, 378b, and as indicated by double-headed arrow 329, some fluid from the first supply line 301 may backflow through the common recycle line 327 and be diverted at T connection 325 into return hydraulic line 309.

Similar to earlier described aspects of the invention, case drain fluid is drained directly from the first and second reversible drive motors 382a, 382b and first and second reversible pumps 378a, 378b into a common return line 304 via respective connecting lines. In addition, optional motor (s) 383b, 385b and 387b as well as valve 394 also preferably drain directly into common return line 304. Line 304 leads directly to the hydraulic fluid reservoir 42. That is, the common return line 304 is separate from return hydraulic line 309. Therefore, case drain oil flowing from the pumps 378a, 378b, motors 378a, 378b, optional motors 383b, 385b and 387b and valve 394, which is among the hottest oil in the header hydraulic system, experiences minimal resistance and optimum cooling during its return to the hydraulic fluid reservoir 42.

FIG. 11 is a schematic layout of the header hydraulic system 334 illustrating operation of the header hydraulic system 334 in a reverse or cleaning mode. In this mode, pressurized hydraulic fluid is pumped by system pump 38 through manifold 44, multi-coupler 36 and valve 394. In the reverse operating mode, valve 394 is piloted to a position whereby fluid flows not to the reel position cylinder(s) 398 but to a second supply line 331 in fluid communication with the system pump 38 for supplying hydraulic fluid to the hydraulic circuit loops 366a, 366b upstream of the first and second reversible drive motors 382a, 382b. More specifically, fluid from valve 394 is delivered along second supply line 331 where it passes through a two-way valve 333 which is piloted into an open position, as described below, after which the fluid enters a flow divider valve 353. The flow divider valve 353 splits the flow received from two-way valve 333 and directs such flow to the first and second reversible drive motors 382a, 382b in order to drive such motors in the reverse or cleaning direction.

Fluid exiting the first reversible drive motor 382a then enters line 311a which leads back to the reversible pump 378a. Prior to reaching pump 378a, however, and depending on the demands of pump 378a, a portion of the fluid from the first reversible drive motor 382a may be diverted at a T connection 317a' toward a T connection 335 at which point the fluid is diverted to line 319a. Before reaching T connection 335, however, the hydraulic fluid passes through a two-way valve 355 which is piloted into an open position, as described below. From line 319a fluid flows through a filter 323 before passing through multi-coupler 36, manifold 44 and filter 40 before returning to the hydraulic fluid reservoir 42.

In the reverse mode of operation, line 311a functions as a first recycle line downstream of the first reversible drive motor for recycling fluid to the first reversible pump 378a. That is, fluid not diverted at T connection 317a' passes to the first reversible pump 378a. The first and second reversible pumps 378a, 378b can be arranged in parallel, as illustrated, and can be driven by at least one PTO 307 and at least one gearbox 309. When the pumps are driven in reverse they should be driven at a speed that is generally slower than when the pumps are driven in the forward direction in order to produce the torque necessary to free clogged crop from the header.

Fluid exiting the second reversible drive motor 382b enters line 311b which leads back to the second reversible pump 378b and to line 319a depending on the course taken at a cross connection 357. That is, depending on the demands the second reversible pump 378b, fluid can pass from cross connection 357 to the second reversible pump through a second recycle line 359. The second recycle line 359 lies downstream of the second reversible drive motor 382b for recycling fluid to the second reversible pump when the hydraulic system operates in a reverse mode. Fluid from cross connection 357 that does not enter the second recycle line 359 passes a two-way valve 361 which can be biased into an open position, as discussed below. Such fluid then combines with exhaust fluid from the first reversible drive motor 382a at T connection 335 and thereafter flows through line 319a.

Fluid exiting the first and second reversible pumps 378a, 378b is stopped from flowing towards the reservoir 42 by check valve 305. Accordingly, such fluid is diverted at a T connection 343 to flow through a line 345 (the pressure from which is used to pilot valve 394 to deliver fluid from the system pump 38 to the second supply line 331). Line 345 is in fluid communication with the first reversible drive motor 382a and the first and second reversible pumps 378a, 378b when the hydraulic system operates in a reverse mode. Fluid passing through line 345 flows to a cross connection 347 from which fluid can pass through an orifice 349 and a check valve 351. Upon passing check valve 351 the fluid merges with the fraction of the fluid delivered by the second supply line 331 that is divided by flow divider valve 353 and directed toward the first reversible drive motor 282a. The purpose of orifice 349 is to create sufficient back pressure at cross connection 347 to pilot two-way valves 333, 355 and 361 into their open positions. The function of check valve 351 is to prevent fluid from the flow divider valve 353 from flowing into line 345.

Figure 12:
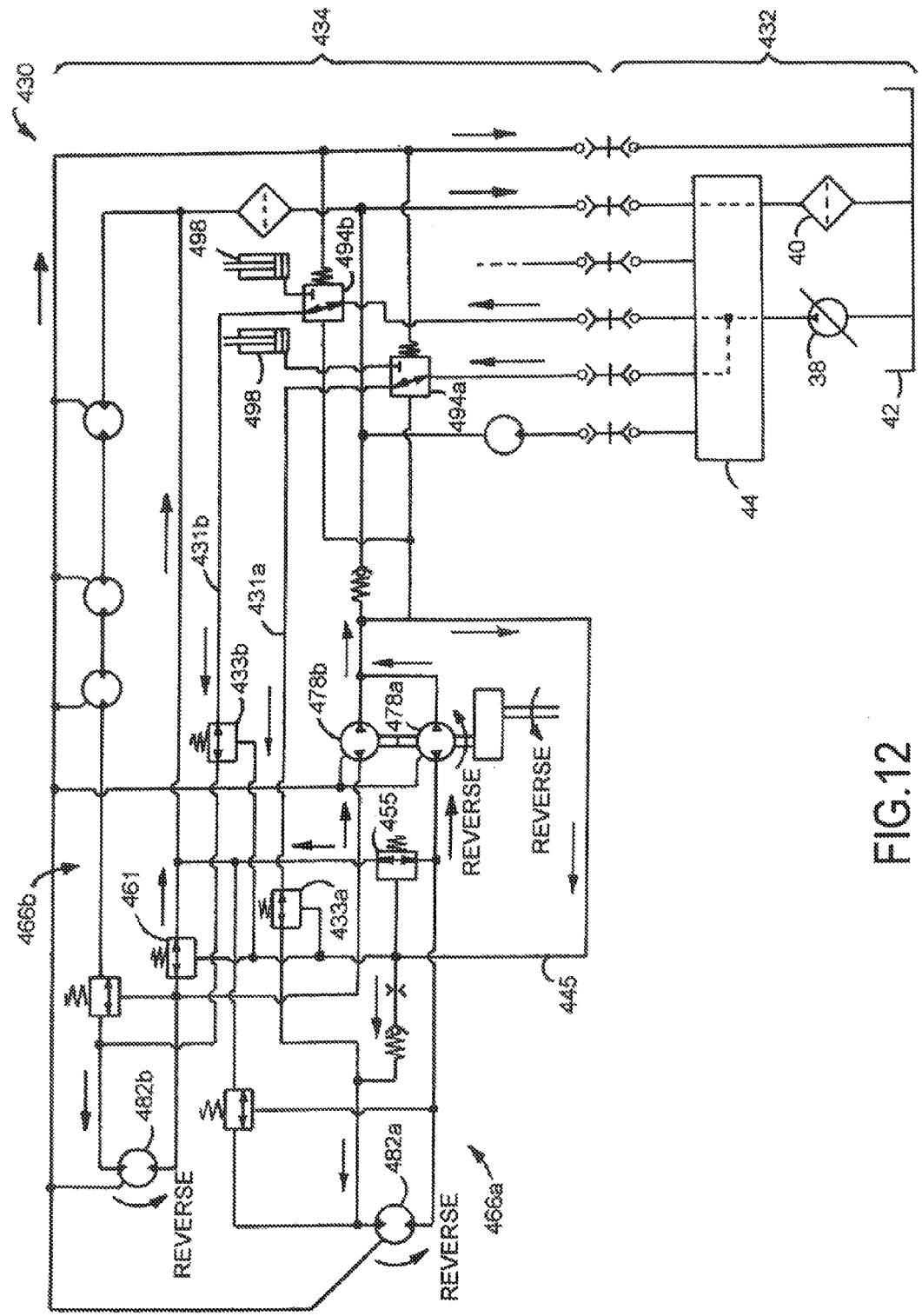
FIG. 12 is a schematic view of a hydraulic system according to yet another aspect of the subject application for use in connection with the agricultural harvester of FIG. 1 illustrating operation in a reverse or cleaning mode.

FIG. 12 illustrates a combined hydraulic system 430 in accordance with another aspect of the subject application operating in a reverse or cleaning mode. Header hydraulic system 434 is similar in many structural and functional respects to header hydraulic system 334 described above in connection with FIG. 11. Accordingly, only those features of FIG. 12 which depart in a material way from their counterparts in FIG. 11 or are otherwise necessary for a proper understanding of the subject application will be described in detail.

As with previous aspects of the subject application, hydraulic fluid is delivered from and recycled to a harvester hydraulic system 432. That is, pressurized hydraulic fluid from the hydraulic fluid reservoir 42 is pumped by system pump 38 through manifold 44 and multi-coupler 36. Unlike the arrangement shown in FIG. 11, however, hydraulic fluid is pumped by the system pump 38 to a pair of three-way directional valves 494a, 494b piloted to conduct fluid to a second supply line 431a and a third supply line 431b in respective fluid communication with first and second hydraulic circuit loops 466a, 466b instead of to e.g., reel piston cylinders 498. More specifically, fluid from valve 494a is delivered to the first hydraulic circuit loop 466a along second supply line 431a and fluid from valve 494b is delivered to the first hydraulic circuit loop 466b along third supply line 431*b*. Fluid in second supply line 431*a* passes through a two-way valve 433*a* and fluid in third supply line 431*b* passes through a two-way valve 433*b*, both of which valves are piloted into an open position when the hydraulic system operates in reverse mode. Fluid from valve 433*a* flows directly to the first reversible drive motor 482*a* via a connecting line and fluid from valve 433*b* flows directly to the second reversible drive motor 482*b* via a connecting line. In this regard, manifold 44 functions as a substitute for the flow divider valve 353 of FIG. 11. Further, the back pressure in line 445 biases or pilots four two-way valves into the open position. That is, the fluid in line 445 biases two-way valves 433*a*, 433*b*, 455 and 461 into the open position when the header hydraulic system 434 is operating in the reverse mode. In contrast, the back pressure in line 345 of FIG. 11 biases three two-way valves into the open position, namely, valves 333, 355 and 361. In all other material respects, however, the arrangement shown in FIG. 12 is structurally and functionally similar to that shown in FIG. 11.

To summarize the subject application, depending on the flow requirements of the reversible drive motor(s) and flow rates of the reversible pump(s), a portion or all of the exhaust flow from the reel drive motor is directed to the inlets of the reversible pumps when the hydraulic systems are operating in forward or harvesting mode. For example, if the flow from the reel drive motor is 13 gallons per minute (gpm), and the pump(s) require 10 gpm, then only 10 gpm from the reel drive motor is directed to gear pump inlet(s) and the remaining 3 gpm are returned to the harvester fluid reservoir along with the return flow from the reversible drive motor(s). Conversely, if the flow from the reel drive motor is reduced, for example, to 6 gpm, and the required flow to the pump(s) remains at 10 gpm, then all 6 gpm from the reel drive motor is directed to pump inlet(s) and the remaining 4 gpm is supplied from the return flow from the reversible motor(s). Under these circumstances, a portion of the motor return hydraulic fluid recirculates within the header hydraulic circuits while the remaining flow returns to the harvester.

As discussed above, the reverse mode is normally operated at a slower speed than in the forward mode. However, corresponding slow PTO drive shaft speeds in connection with the gear pumps can result in inefficient operation. At very low pump speeds, what little pump flow is produced will either leak internally (around the pump gears) or leak out to the case drain system. In this case, the motors may rotate intermittently or not at all and the operator is left to clean the slug or blockage manually. To allow for improved reverse motor operation, supplemental flow is supplied from at least one header hydraulic circuit. The reel position circuits are available for this purpose since changes to the reel position are not required during the header reversing operation. These circuits normally operate at full system pressure which results in higher torque to remove the crop slug or blockage. Another feature of the present application is the ability to pulse the reverse flow to improve the ability to remove crop slugs which could not be removed with a steady oil flow. That is, the flow is turned on and off at a sufficient rate as to act like a hammer on the motors, thus pounding the slug out until it breaks free.

Further, while the present application is disclosed as it would function using pilot-operated valves, it will be understood that solenoid valves or other valves suitable for achieving the objectives of the subject application may be used in lieu of or in combination with the pilot valves disclosed herein.

Included among the advantages of the hydraulic system of the subject application are the following. The capability of reversing the header PTO at slow speeds for improved torque and control without adversely affecting the hydraulic functions on the header. A unique reverse (cleaning) mode oil flow pattern which directs high pressure oil to the reversible drive motor circuits from the reel position circuits to maintain acceptable motor speeds in the presence of very slow pump shaft input speeds. A dedicated drain line to the combine's hydraulic reservoir which allows for the use of pumps and motors that require low case drain pressures. The ability to apply flow pulses to the reversible drive motor(s) when in reverse mode to more effectively break loose crop slugs. Reverse pump flow is used to provide pilot pressure to various pilot-operated hydraulic valves which redirect oil flow as needed in reverse mode. After piloting any valves in reverse mode, any excess oil flow from the pump(s) is applied to the knife drive motor for optimum performance.

It will be appreciated by those skilled in the art that changes could be made to the aspects described above without departing from the broad inventive concept thereof. It is to be understood, therefore, that the subject application is not limited to the particular aspects disclosed, but it is intended to cover modifications within the spirit and scope of the subject application as defined by the appended claims.

I claim:

1. A hydraulic system of a header connectable to an agricultural combine comprising a harvester that includes a hydraulic fluid reservoir and a system pump that pumps hydraulic fluid from the reservoir, the hydraulic system comprising:
  a hydraulic circuit loop that includes:
    a first reversible drive motor, and
    a reversible pump that pumps hydraulic fluid to the first reversible drive motor;
  a common hydraulic line connected to the hydraulic circuit loop;
  a first supply line connectable with the system pump for receiving first hydraulic fluid therefrom and for supplying the first hydraulic fluid to the hydraulic circuit loop via the common hydraulic line when the hydraulic system operates in a forward mode;
  a second supply line connectable with the system pump for receiving second hydraulic fluid therefrom for supplying the second hydraulic fluid to the hydraulic circuit loop via the common hydraulic line when the hydraulic system operates in a reverse mode; and
  a check valve disposed in the common hydraulic line for regulating flow between the first and second supply lines and the hydraulic circuit loop.

2. The hydraulic system of claim 1, further comprising a return hydraulic line in fluid communication with the hydraulic circuit loop and connectable with the hydraulic fluid reservoir.

3. The hydraulic system of claim 1, further comprising a common return hydraulic line and connecting lines for draining hydraulic fluid from the first reversible drive motor and the reversible pump into the common return hydraulic line.

4. The hydraulic system of claim 1, further comprising a reel drive motor disposed in the first supply line, the reel drive motor configured for driving a reel of the header.

5. A hydraulic system of a header connectable to an agricultural combine comprising a harvester that includes a hydraulic fluid reservoir and a system pump that pumps hydraulic fluid from the reservoir, the hydraulic system comprising:

a common hydraulic pressure line connectable to the system pump, the common hydraulic pressure line comprising a first branch and a second branch;
a first hydraulic circuit loop in fluid communication with the first branch of the common hydraulic pressure line, the first hydraulic circuit loop including:
a first reversible drive motor downstream of the first branch of the common hydraulic pressure line, and
a first reversible pump downstream of the first branch of the common hydraulic pressure line pumping hydraulic fluid to the first reversible drive motor;
a second hydraulic circuit loop in fluid communication with the second branch of the common hydraulic pressure line, the second hydraulic circuit loop including:
a second reversible drive motor downstream of the second branch of the common hydraulic pressure line, and
a second reversible pump downstream of the second branch of the common hydraulic pressure line pumping hydraulic fluid to the second reversible drive motor;
a first supply line in fluid communication with the first and second branches of the common hydraulic pressure line for supplying hydraulic fluid to the first and second hydraulic circuit loops via the first and second branches, respectively, when the hydraulic system operates in a forward mode; and
a second supply line in fluid communication with the first and second branches of the common hydraulic pressure line for supplying hydraulic fluid to the first and second hydraulic circuit loops via the first and second branches, respectively, when the hydraulic system operates in a reverse mode.

6. The hydraulic system of claim 5, further comprising first connecting lines and second connecting lines, wherein hydraulic fluid is drained via the first connecting lines from the first and second reversible pumps and via the second connecting lines from the first and second reversible drive motors into a common return hydraulic line.

7. The hydraulic system of claim 5, further comprising a first return hydraulic line in fluid communication with the first hydraulic circuit loop and a second return hydraulic line in fluid communication with the second hydraulic circuit loop.

8. The hydraulic system of claim 7, wherein the first and second return hydraulic lines are in fluid communication with a common return hydraulic line that is connectable with the hydraulic fluid reservoir.

9. The hydraulic system of claim 5, further comprising a reel drive motor disposed in the first supply line, the reel drive motor configured for driving a reel of the header.

10. A hydraulic system of a header connectable to an agricultural combine comprising a harvester that includes a hydraulic fluid reservoir and a system pump that pumps hydraulic fluid from the reservoir, the hydraulic system comprising:
a hydraulic circuit loop that includes:
a first reversible drive motor, and
a reversible pump for pumping hydraulic fluid to the first reversible drive motor;
a common return line in fluid communication with the first reversible drive motor and the first reversible pump and connectable to the hydraulic fluid reservoir;
a first supply line connectable with the system pump for receiving first hydraulic fluid therefrom and for supplying the first hydraulic fluid to the hydraulic circuit loop upstream of the reversible pump when the hydraulic system operates in a forward mode; and
a second supply line connectable with the system pump for receiving second hydraulic fluid therefrom for supplying the second hydraulic fluid to the hydraulic circuit loop upstream of the first reversible drive motor when the hydraulic system operates in a reverse mode.

11. The hydraulic system of claim 10, further comprising connecting lines for draining hydraulic fluid from the first reversible drive motor and the reversible pump into the common return line.

12. The hydraulic system of claim 11, further comprising a first recycle hydraulic line in fluid communication with the first reversible drive motor and the reversible pump when the hydraulic system operates in a forward mode.

13. The hydraulic system of claim 11, further comprising a second recycle hydraulic line in fluid communication with the first reversible drive motor and the reversible pump when the hydraulic system operates in a reverse mode.

14. The hydraulic system of claim 10, further comprising a reel drive motor disposed in the first supply line, the reel drive motor configured for driving a reel of the header.

15. A hydraulic system of a header connectable to an agricultural combine comprising a harvester that includes a hydraulic fluid reservoir and a system pump that pumps hydraulic fluid from the reservoir, the hydraulic system comprising:
a first hydraulic circuit loop connectable to the system pump, the first hydraulic circuit loop including:
a first reversible drive motor, and
a first reversible pump pumping hydraulic fluid to the first reversible drive motor;
a second hydraulic circuit loop connectable to the system pump, the second hydraulic circuit loop including:
a second reversible drive motor, and
a second reversible pump pumping hydraulic fluid to the second reversible drive motor;
a first supply line in fluid communication with the first and second hydraulic circuit loops for supplying hydraulic fluid to the first and second hydraulic circuit loops when the hydraulic system operates in a forward mode;
a second supply line in fluid communication with the first and second hydraulic circuit loops for supplying hydraulic fluid to the first and second hydraulic circuit loops when the hydraulic system operates in a reverse mode;
a common recycle line disposed in both the first hydraulic circuit loop and the second hydraulic circuit loop for recycling hydraulic fluid in the first hydraulic circuit loop and the second hydraulic circuit loop;
a common return line in fluid communication with the first and second hydraulic circuit loops and connectable to the hydraulic fluid reservoir; and
a reel drive motor disposed in the first supply line, the reel drive motor configured for driving a reel of the header.

16. The hydraulic system of claim 15, wherein the common recycle line recycles hydraulic fluid in the first hydraulic circuit loop and the second hydraulic circuit loop based on demand from the first reversible pump and the second reversible pump, respectively, when the hydraulic system operates in a forward mode.

17. The hydraulic system of claim 16, wherein the common recycle line recycles fluid upstream of the first and second reversible pumps when the hydraulic system operates in the forward mode.

18. The hydraulic system of claim 15, further comprising a first recycle line downstream of the first reversible drive motor recycling fluid to the first reversible pump and a second recycle line downstream of the second reversible drive motor recycling fluid to the second reversible pump when the hydraulic system operates in a reverse mode.

19. A hydraulic system of a header connectable to an agricultural combine comprising a harvester that includes a hydraulic fluid reservoir and a system pump that pumps hydraulic fluid from the reservoir, the hydraulic system comprising:
- a first hydraulic circuit loop connectable to the system pump, the first hydraulic circuit loop including:
  - a first reversible drive motor, and
  - a first reversible pump pumping hydraulic fluid to the first reversible drive motor;
- a second hydraulic circuit loop connectable to the system pump, the second hydraulic circuit loop including:
  - a second reversible drive motor, and
  - a second reversible pump pumping hydraulic fluid to the second reversible drive motor;
- a first supply line in fluid communication with the first and second hydraulic circuit loops for supplying hydraulic fluid to the first and second hydraulic circuit loops when the hydraulic system operates in a forward mode;
- a second supply line in fluid communication with the first hydraulic circuit loop for supplying hydraulic fluid to the first hydraulic circuit loop when the hydraulic system operates in a reverse mode;
- a third supply line in fluid communication with the second hydraulic circuit loop for supplying hydraulic fluid to the second hydraulic circuit loop when the hydraulic system operates in the reverse mode;
- a common recycle line disposed in both the first hydraulic circuit loop and the second hydraulic circuit loop for recycling hydraulic fluid in the first hydraulic circuit loop and the second hydraulic circuit; and
- a common return line in fluid communication with the first and second hydraulic loops and connectable to the hydraulic fluid reservoir.

\* \* \* \* \*